United States Patent
Shirai et al.

(10) Patent No.: US 8,683,335 B2
(45) Date of Patent: Mar. 25, 2014

(54) INFORMATION PROCESSING DEVICE, INFORMATION PROCESSING METHOD, AND PROGRAM FOR THE SAME

(75) Inventors: Yasuhiro Shirai, Kanagawa (JP); Toshihiro Morita, Kanagawa (JP); Susumu Morita, Saitama (JP); Taku Sugawara, Tokyo (JP)

(73) Assignee: Sony Corporation, Tokyo (JP)

( * ) Notice: Subject to any disclaimer, the term of this patent is extended or adjusted under 35 U.S.C. 154(b) by 1409 days.

(21) Appl. No.: 11/777,614

(22) Filed: Jul. 13, 2007

(65) Prior Publication Data

US 2008/0046397 A1 Feb. 21, 2008

(30) Foreign Application Priority Data

Aug. 21, 2006 (JP) ................................. 2006-223893

(51) Int. Cl.
*G06F 17/30* (2006.01)

(52) U.S. Cl.
USPC ..... 715/716; 715/727; 715/764; 707/E17.001

(58) Field of Classification Search
USPC .................. 715/764, 716, 727; 707/E17.001
See application file for complete search history.

(56) References Cited

U.S. PATENT DOCUMENTS

| | | | |
|---|---|---|---|
| 6,745,199 B2 * | 6/2004 | Morita et al. | 1/1 |
| 6,760,721 B1 * | 7/2004 | Chasen et al. | 1/1 |
| 2002/0065817 A1 * | 5/2002 | Ito et al. | 707/5 |

OTHER PUBLICATIONS

"Walkman Series A", "ArtistLink", May 17, 2006, http://www.walkman.sony.co.jp/artistlink-info/wm.html.*
U.S. Appl. No. 11/734,405, filed Apr. 12, 2007, Shirai, et al.
U.S. Appl. No. 11/736,731, filed Apr. 18, 2007, Ogata, et al.
U.S. Appl. No. 11/738,011, filed Apr. 20, 2007, Morita, et al.
Office Action issued Jun. 2, 2011, in Japanese Patent Application No. 2006-223893 (with English-language translation).

* cited by examiner

*Primary Examiner* — Andrea Leggett
(74) *Attorney, Agent, or Firm* — Oblon, Spivak, McClelland, Maier & Neustadt, L.L.P.

(57) ABSTRACT

An information processing device includes: a storage unit; a first display control unit; and a demanding unit. The storage unit that stores attribute data representing specified attribute of contents and category data representing a category of the attribute correlated to each other. The first display control unit that provides controls for displaying information for a selected attribute and for displaying, in a categorized state, information for related attributes correlated to the same category as that of the attribute on a correlation display screen. The demanding unit that demands data search by referring to the correlated attribute selected corresponding to information selected from among those displayed on the correlation display screen to an information provision device.

11 Claims, 19 Drawing Sheets

FIG.5

| ARTIST GROUP ID | ARTIST ID | ORDER INFORMATION | ATTRIBUTE INFORMATION |
|---|---|---|---|
| AGID_1 | AID_1 | 1 | USER A |
| AGID_1 | AID_2 | 2 | USER B |
| AGID_1 | AID_3 | 3 | SYSTEM |
| AGID_2 | AID_2 | 2 | USER A |
| AGID_2 | AID_4 | 1 | USER A |
| ... | ... | ... | ... |

| CONTENTS ID | CONTENTS NAME | ALBUM NAME | ARTIST NAME | GENRE NAME | CONTENTS FILE NAME | REPRODUCTION-COMPLETED FLAG |
|---|---|---|---|---|---|---|
| TID_1 | SONG 1 | ALBUM 1 | AT1 | POPS | Song1.oma | 0 |
| TID_2 | SONG 2 | ALBUM 1 | AT1 | POPS | Song2.oma | 0 |
| TID_3 | SONG 3 | ALBUM 2 | AT2 | ROCK | Song3.oma | 0 |
| ... | ... | ... | ... | ... | ... | ... |

72

FIG.14 http://music_site.jp/servlet/ArtistFinder?TEMPLATE=SS_ArtLnkSrch_Rslt.html&INTERVAL=30&NAME_WORD=XXXXXX

FIG.15

```xml
<?xml version="1.0" encoding="Shift-jis" ?>
-<search_result>
   <org_name_word>SAKAMOTO</org_name_word>
   <all_count>5</all_count>
   <begin_index>1</begin_index>
   <end_index>5</end_index>
   <artist_count>5</artist_count>
   <page_count>1</page_count>
-<item>
-<artist>
   <url>http://music_site.jp/artist/80307744/70000417/</url>
   <art_name>SAKAMOTO HANAKO</art_name>
   <entry>12</entry>
   </artist>
-<artist>
   <url>http://music_site.jp/artist/80311316/VIA008957/</url>
   <art_name>SAKAMOTO TARO</art_name>
   <entry>8</entry>
   </artist>
-<artist>
   <url>http://music_site.jp/artist/80312087/WMG4365/</url>
   <art_name>Mr.SAKAMOTO</art_name>
   <entry>27</entry>
   </artist>
-<artist>
   <url>http://music_site.jp/artist/80311556/UMLG00559/</url>
   <art_name>SAKAMOTO SAKAKO</art_name>
   <entry>241</entry>
   </artist>
-<artist>
   <url>http://music_site.jp/artist/80312032/EMI00271/</url>
   <art_name>SUZUKI GEN AND SAKAMOTO SAKAKO</art_name>
   <entry>12</entry>
   </artist>
   </item>
   </search_result>
```

FIG. 16

■ A CASE WHERE THE NUMBER OF HIT ITEMS IS ONE

`<url>http://music_site.jp/artist/80307744/70000417/</url>`

■ A CASE WHERE THE NUMBER OF HIT ITEMS IS TWO OR MORE

```
http://music_site.jp/servlet/ArtistFinder?INTERVAL=30&
TEMPLATE=SS_art_srch_nm_rslt.html&WORD_KIND=&
GENERAL_WORD=&TITLE_WORD=&NAME_WORD=XXXXXX
```

■ A CASE WHERE THE NUMBER OF HIT ITEMS IS ZERO

```
http://music_site.jp/servlet/ArtistFinder?INTERVAL=30&
TEMPLATE=SS_art_srch_nm_rslt.html&WORD_KIND=&
GENERAL_WORD=&TITLE_WORD=&NAME_WORD=XXXXXX
```

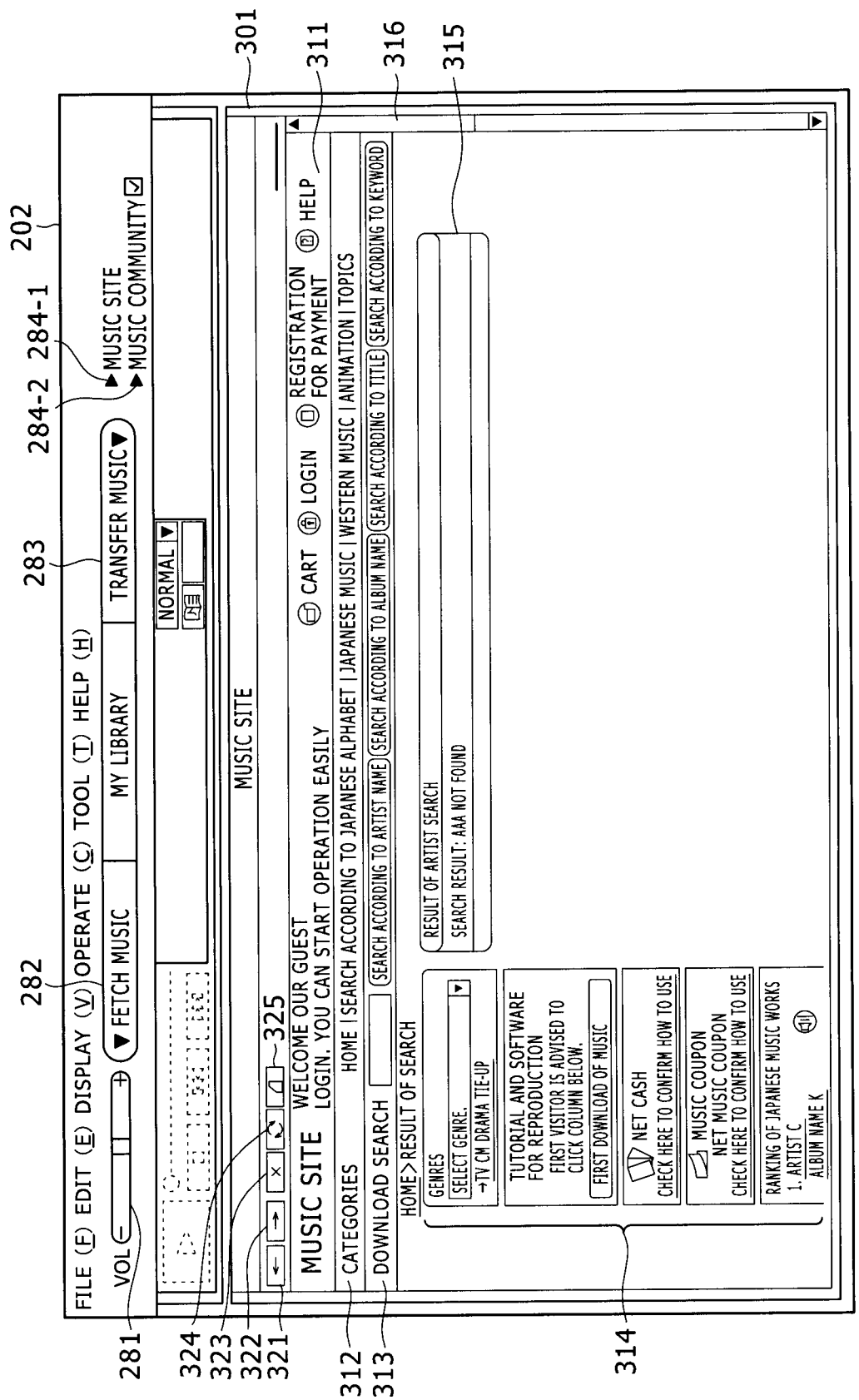

INFORMATION PROCESSING DEVICE, INFORMATION PROCESSING METHOD, AND PROGRAM FOR THE SAME

CROSS REFERENCES TO RELATED APPLICATIONS

The present invention contains subject matter related to Japanese Patent Application JP 2006-223893 filed with the Japan Patent Office on Aug. 21, 2006, the entire contents of which being incorporated herein by reference.

BACKGROUND OF THE INVENTION

1. Field of the Invention

The present invention relates to an information processing device, an information processing method, and a program for the same, and more specifically to a method and a device making it possible to easily retrieve information for a desired artist from a contents-providing server on a display screen for displaying correlation between artists appearing in contents as well as to a program for the same.

2. Description of the Related Art

Recently, there has been becoming more and more popularized a method for acquiring music data into a personal computer (PC) by ripping music pieces recorded in a CD (Compact Disc) or downloading desired music pieces from a music distribution server by making use of a music distribution service or the like, and people enjoy contents such as the acquired music data with a PC or a portable device (PD).

Recently, a PC or a PD is equipped with a storage unit capable of storing a large amount of data therein, and a user can have various and diversified contents recorded in a PC. When the contents recorded in a PC or in a PD includes those not preferred by a user, however, it is troublesome for the user to retrieve contents just fitting to the user's mood from the various and diversified contents.

To overcome the problem, the present applicant has introduced into the market a product enabling easy search of contents fetched into a PC or a PD by a user. As described, for instance, in Non-patent Document 1, "Detailed information for "Walkman Series A", "Artistlink"", by making use of the product, a user can acquire artist link information relating to the fetched music data (namely information for a classification representing an attribute of artists included in the contents via a network. Then the user can have a screen representing relation between the artists displayed on a monitor, and select contents to be listened to next time according to the user's preference.

This artist link information can be acquired from a user's friend or a server providing the information. When a user acquired the artist link information, for instance, from the user's friend and then tries to has a screen representing relations between the artists, sometimes there occurs the case in which information for an artist not relating to the contents stored in the user's PC or PD is displayed. With the additional information, the user can know presence of and relations between the artist(s) not relating to the contents stored in the user's PC or PD.

SUMMARY OF THE INVENTION

In the related art, however, even when a user acquires the artist link information, for instance, from the user's friend, sees a screen showing relations between artists, and know presence of and relations between the artists not relating to the contents stored in the user's PC or PD, if the users wants to acquire contents relating to any of the artists, the user is demanded to search for contents relating to the desired artist by intentionally accessing a music piece distribution server or the like.

In other words, even when artist information not relating to the contents stored in a user's PC or PD is displayed on a screen showing relations between artists, the user may not directly access a music piece transmission server for retrieving information for the artist not relating to contents stored in the user's PC or PD.

The present invention was made in the light of the circumstances as described above, and there is a need for the present invention to provide a device and a method enabling a user to retrieve information for an artist not relating to contents owned by the user from a contents providing server on a display screen for displaying relations between artists appearing in contents.

An information processing device in an embodiment of the present invention includes: a storage unit, a first display control unit, and a demanding unit. The storage unit that stores attribute data representing specified attribute of contents and category data representing a category of the attribute correlated to each other. The first display control unit that provides controls for displaying information for a selected attribute and for displaying, in a categorized state, information for related attributes correlated to the same category as that of the attribute on a correlation display screen. The demanding unit that demands data search by referring to the correlated attribute selected corresponding to information selected from among those displayed on the correlation display screen to an information provision device.

The information processing device in the embodiment of the present invention further includes a second display control unit that controls displays on a search result screen according to a result of search sent from the information provision device in response to a request from the demanding unit.

The information processing device in the embodiment of the present invention, the demanding unit demands data search by referring to the attribute corresponding to information selected from among those displayed on the correlation display screen to information providing device.

The information processing device in the embodiment of the present invention, further includes a contents storage unit that stores contents, contents of the related attribute is stored in the contents storage unit.

The information processing device in the embodiment of the present invention, further includes a contents storage unit that stores contents, contents of the related attribute is not stored in the contents storage unit.

There is a need for the present invention to provide a method of processing information with an information processing device having a storage unit that stores attribute data representing a specified attribute of contents and category data representing a category of the attribute correlated to each other, the method includes the steps of: providing and demanding. The providing step controls for displaying information for a selected attribute and for displaying, in a categorized state, information for related attributes correlated to the same category as that of the attribute on a correlation display screen. The demanding step demands data search by referring to the attribute corresponding to information selected from among those displayed on the correlation display screen.

There is a need for the present invention to provide a program for making an information processing device including a storage unit that stores attribute data representing specified attribute of contents and category data representing a category of the attribute correlated to each other execute the step of: providing and demanding. The providing step controls for displaying information for a selected attribute and also for displaying, in a categorized state, information for related attributes correlated to the same category as that of the attribute on a correlation display screen. The demanding step demands data search by referring to the attribute corresponding to information selected from among those displayed on the correlation display screen.

In an embodiment of the present invention, data search for an artist not relating to the contents which a user does not own can be performed on a display screen on which relations between artists relating to attributes of the contents are displayed.

BRIEF DESCRIPTION OF THE DRAWINGS

FIG. 5 is a view illustrating an example of a configuration of an artist link correspondence table shown in FIG. 4;

FIG. 6 is a view illustrating an example of a configuration of a contents information database shown in FIG. 3;

FIG. 14 is a view illustrating an example of a search URL;

FIG. 15 is a view illustrating an example of a result of data search sent from a server;

FIG. 16 is a view illustrating an example of a display address URL decided according to a result of data search;

FIG. 19 is a view illustrating still another example of a configuration of the search result screen.

DETAILED DESCRIPTION OF THE PREFERRED EMBODIMENTS

Figure 1:
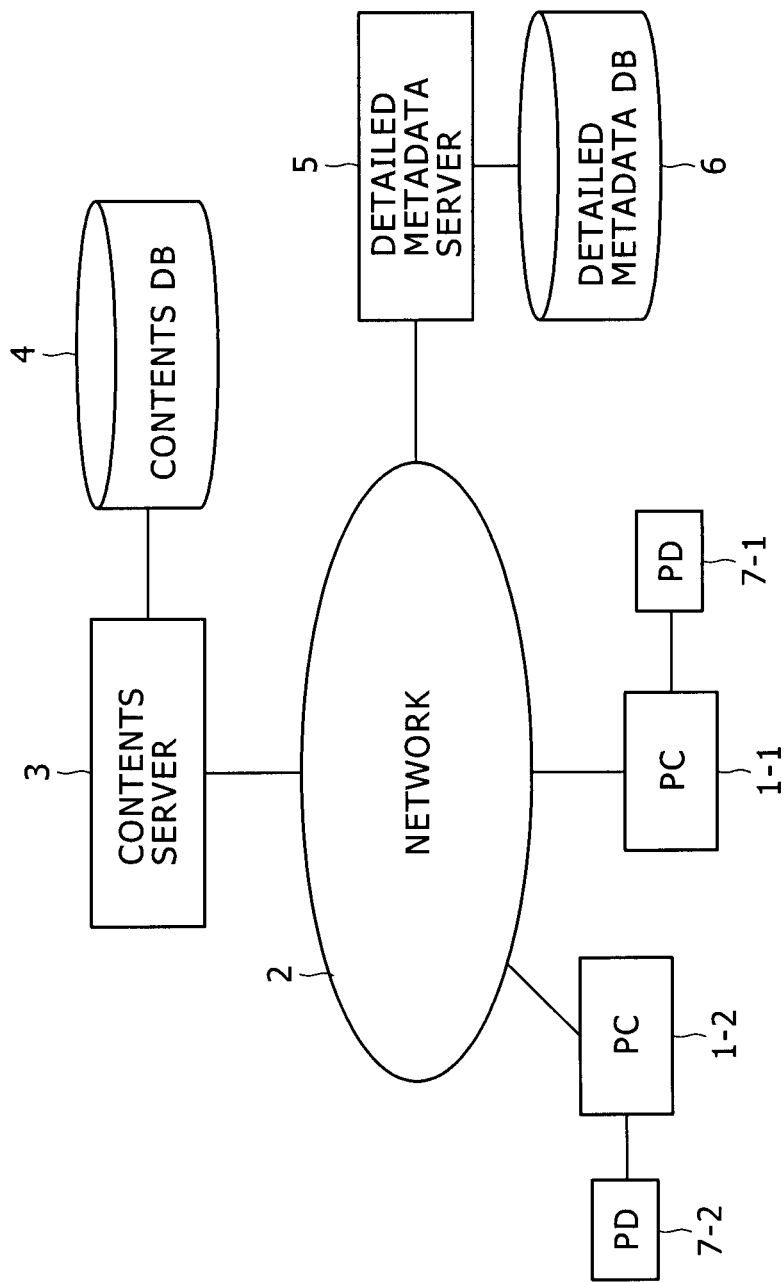
FIG. 1 is a view illustrating an example of a configuration of a contents provision system according to an embodiment of the present invention.

Embodiments of the present invention are described below, and the correspondence between the requirements in the present invention and embodiments described in the specification of in relation to the drawings is, for instance, as described below. The following descriptions are provided for insuring that embodiments supporting the present invention are described or illustrated in the specification or the drawings. Therefore, even if there are embodiments described in the specification or illustrated in the drawings but not described as those corresponding to the requirements in the present invention, it should not be understood that the embodiments do not corresponds to the requirements in the present invention. On the contrary, even if there is am embodiment described as that corresponding to any specific requirement in the present invention, it does not mean that the embodiment dos not correspond to another embodiment other than that specific embodiment.

An information processing device in one embodiment of the present invention (e.g, a PC1 shown in FIG. 1) includes a storage unit, a first display control unit, and a demanding unit. The storage unit (e.g., an artist correspondence table 83 shown in FIG. 4) stores attribute data (e.g., an artist ID) representing a specific attribute of contents (e.g., a name of an artist) and category data (e.g., an artist group ID) representing a category of the attribute (e.g., an artist group name) in the correlated state. The first display control unit (e.g., an artist link display processing section 51 shown in FIG. 3) provides controls for displaying information for selected attribute (e.g., a base point icon 251 shown in FIG. 9) and categories correlated to the attribute (e.g., folder icon 252-1 shown in FIG. 9) and also displaying information for correlated attributes correlated to the category for the attribute described above (e.g., correlation icons 253-1 and 253-2 shown in FIG. 9) in the categorized state on a correlation display screen (e.g., an artist link tree screen 213 shown in FIG. 9). The demanding unit (e.g., an artist search control section 55 shown in FIG. 3) that demands data search by using the correlated attributed for selected information displayed on the correlation display screen to an information providing equipment (e.g., a contents server 3 shown in FIG. 1).

The information processing device can furthermore include a second display control unit (e.g., a basic display processing section 56 shown in FIG. 3) that controls displays on a search result screen (e.g., a search result screen 301 shown in FIG. 17) corresponding to a result of search sent from the information providing equipment.

The information processing device can furthermore include a contents storage unit that stores contents therein (e.g., a contents file storing section 73). In this configuration, contents for the correlated attributes may be stored in the contents storage unit.

The information processing device can furthermore include a contents storage unit (e.g., the contents file storing section 73 shown in FIG. 3) that stored contents therein. In this configuration, contents for the correlated attributes may be demanded to be stored in the contents storage unit.

A method and a program for processing information in one embodiment of the present invention are used in the information processing device having a storage unit that stores therein attribute data representing specified attribute of contents and category data representing a category of the attribute correlated to each other in the categorized state. The method includes the step of providing controls for displaying information for a selected attribute and information for categories correlated to the attribute and also for displaying information for the attributed correlated to the same category of the attribute in the categorized state on the correlation display screen (e.g., a step S104 shown in FIG. 10) and demanding, to the information processing device, data search by using the selected correlation attribute for which the information displayed on the correlation display screen is selected (e.g., a step S203 shown in FIG. 13).

Embodiments of the present invention are described below with reference to the related drawings.

FIG. 1 illustrates an example of a configuration of a contents providing system according to an embodiment of the present invention.

Personal computers 1-1 and 1-2 are connected to a network 2 represented by Internet. In the following description, when any specific definition is not necessary, the personal computers 1-1 and 1-2 are simply referred to as PC1. Although two units of PC1 are shown in this embodiment, any number of PCs can be connected to the network 2.

Connected to the network 2 are a contents server 3 for providing contents such as moving images or music pieces to the PC1 and a detailed meta server 5. Any numbers of the contents servers 3 and the detailed meta servers 5 may be attached to the network 2. In the example shown in FIG. 1, a case in which contents for music pieces is provided will be described.

The contents server 3 has a contents database (DB) 4 with contents data for music pieces or the like (sometimes referred to as contents data in the following description) and metadata corresponding to the contents stored therein. The metadata includes a plurality of attributes such as, for instance, a name of an album in which the contents is included, a name of an artist playing or providing the contents, a genre (category) of the contents, a music tone, rhythm, a ranking value (parameter) for the contents in the market.

When the contents server 3 receives a demand for data search from the PC1, the contents server 3 performs data search for the data in the database 4, and sends a result of data search to the PC1. When the contents server 3 receives a demand for display from the PC1, the contents server 3 sends the demanded image data to the PC1. In addition, the contents server 3 performs authentication of a user registered for provision of contents in response an access from the PC1 for demanding contents. The contents server 3 retrieves content data and metadata for the contents demanded by the user from among various and diversified contents stored in the contents database 4, and sends the contents data and metadata to the PC1 with authenticated user via the network 2. A contents provider may provide contents data for various and diversified contents recommended to the user.

The detailed metadata server 5 has a contents details metadata database (DB) 6 in which detailed metadata for various and diversified contents transacted in the market is stored. The detailed metadata includes a contents ID (Identifier) which is an identifier for contents, metadata appended to contents data (e.g., an artist name or a genre), category data representing categories for classification of similar contents (e.g., subgenre).

The subgenre is information for one or more genres other than the genres in the metadata for contents A, yet presumably most proximate (similar) to the genre of the contents A. Contents in the metadata can be classified to a plurality of subgenres similar to a genre P. In other words, contents is classified to only one genre in the metadata, but may be classified to a plurality of subgenres in the metadata. More specifically, each contents classified as subgenre may be similar to each other. For instance, the detailed metadata includes, for instance, a contents ID for contents, an artist name appearing in the contents, and names of subgenres to which similar contents is classified.

The detailed metadata server 5 sends, of the detailed metadata stored in the detailed metadata database, detailed metadata for a contents ID for the contents acquired in the PCd via the network 2.

The PC1 accesses the contents server 3 using client software such as a Web browser, and records contents data or metadata received from the contents server 3, or encodes the contents data received from a CD (Compact Disc) according to a predefined scheme (e.g., ATRAC3plus (trademark)), and records the encoded data together with the metadata. The metadata is acquired from a CD or other metadata server not shown.

Then the PC1 generates artist link information relating to artists appearing in the contents based on received detailed metadata, records the generated artist link information, and displays artist link information specified by a user. The PC1 edits the recorded and displayed artist link information according to the user's operations, selects a desired artist for data search from the contents server 3, or generates a play list in which an order of reproduced contents is described, and reproduces the recorded contents data by making use of the information described above.

The PC1-1 and 1-2 are detachably connected to portable devices (PD) 7-1 and 7-2, which are portable recording/reproducing device and mounted via a USB (Universal Serial Bus) cable or the like to the PCs, respectively. When it is not necessary to describes the PD7-1 and 7-2 discretely, the devices are referred to simply as PD7 in the following description. The PC1 transfers the recorded contents data, metadata, edited artist link information, the generated play list or the like to the connected PD7.

The PD7 records various and diversified contents data, metadata thereof, the contents data, the edited artist link information, the generated play list, and the like, and reproduces the contents data by making use of the contents data, metadata, artist link information, the play list and the like recorded as described above. Furthermore, when a removable medium 22 with various and diversified contents files previously recorded therein (refer to FIG. 2) is connected thereto, the PD7 can reproduce contents data and the like recorded in the removable medium 22.

The configuration shown in FIG. 1 illustrates a case in which the PD7 acquires contents files from the contents server 3 via the PC1. However, other configurations are also allowable in which the PD7 is directly connected to the network 2 or acquires data directly from the contents server 3 or the detailed metadata server 5, for instance, by means of wireless communications.

Figure 2:
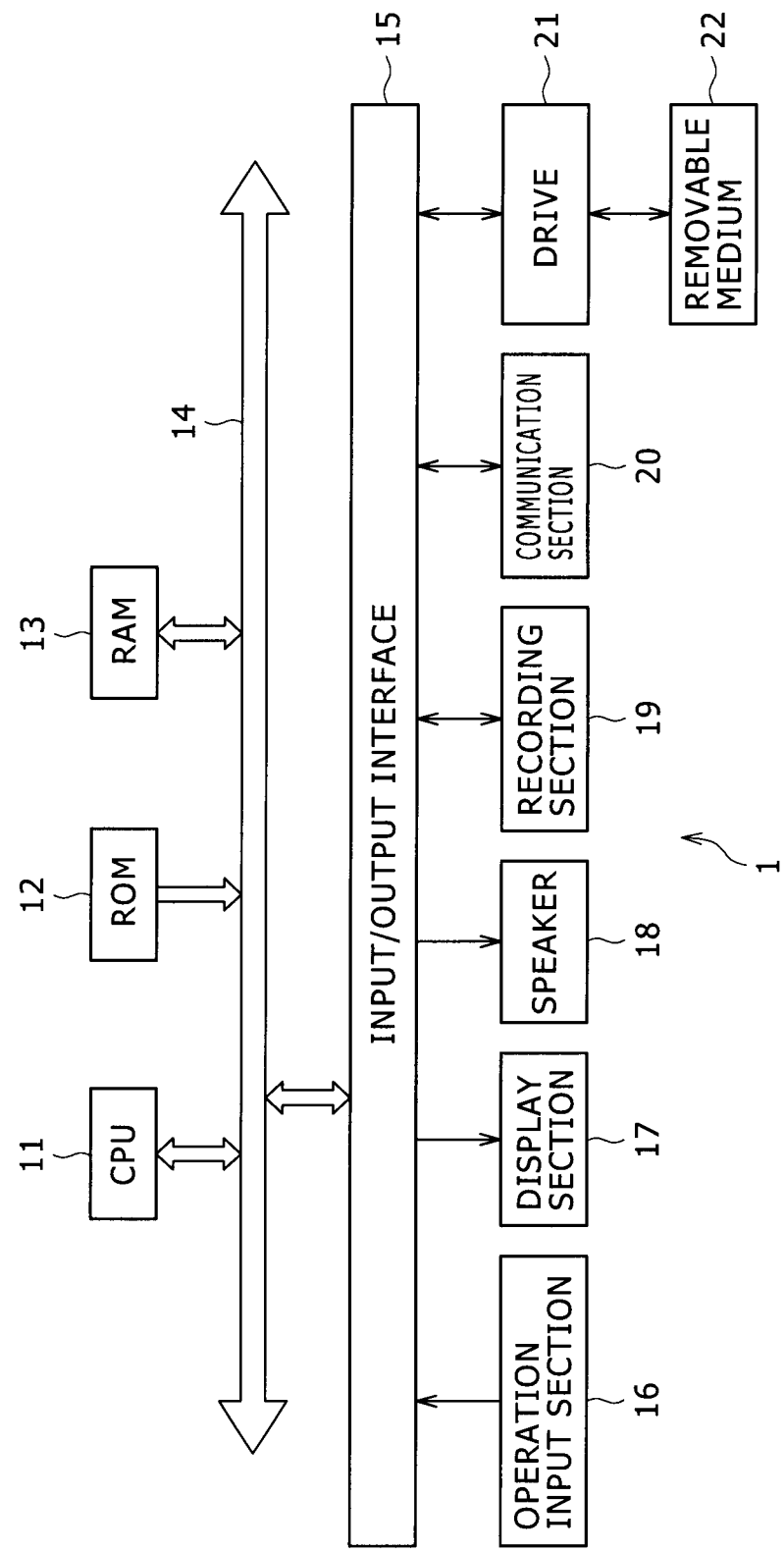
FIG. 2 is a block diagram illustrating an example of a hardware configuration of a PC shown in FIG. 2.

FIG. 2 illustrates an example of a hardware configuration of the PCd.

A CPU (Central Processing Unit) 11 executes various types of processing according to a program stored in a ROM (Read Only Memory) 12 or loaded from a storage section 18 to a RAM (Random Access Memory) 13. Also data for execution of the various types of processing is stored in the RAM 13 according to the necessity.

The CPU 11, the ROM 12, and the RAM 13 are connected to each other via a bus 14. Also connected to the bus 14 is an input/output interface 15.

Connected to the input/output interface 15 are an operation input section 16 including a keyboard, a mouse, or the like; a display section 17 which is a display including a CRT (Cathode Ray Tube), an LCD (Liquid Crystal Display) and the like; a speaker 18; a storage section 19 based on a hard disk or the like; and a communication section 20 including a modem, a terminal adaptor, a USB interface, and the like. The communication section 20 executes the communication process via the network 2 or a USB cable.

A diver 21 may be connected to the input/output interface 15 according to the necessity. Furthermore, a removable medium such as a magnetic disk, an optical disk, a magneto optical disk, or a semiconductor memory may be connected to the input/output interface 15 according to the necessity, and a computer program read out from the removable medium is installed in the storage section 19 according to the necessity.

Although not shown in FIG. 2, also each of the contents server 3, the detailed metadata server 5, and the PD7 is configured with a computer having the basically same configuration as that of the PC1 shown in FIG. 2. Therefore, in the following description, the configuration shown in FIG. 2 is cited also as a configuration of the contents server 3, the detailed metadata server 5, and the PD7.

When the CPU 11 executes various types of program, the computer shown in FIG. 2 functions as any of the PC1, the contents server 3, the detailed metadata server 5, or the PD7 shown in FIG. 1. In this case, the programs can previously be recorded in a ROM 12 as a recording medium incorporated in the computer shown in FIG. 2 or in the storage section 19. Alternatively, the programs can temporally or permanently be stored (recorded) in the removable medium 22 such as a magnetic disk, an optical disk, a magneto optical disk, or a semiconductor memory and can be provided as packaged software.

Furthermore, the program is not only installed in the computer shown in FIG. 2 from the removable medium 22 as shown described above, but also may be transferred from a downloaded site via an artistic satellite for digital satellite broadcasting to the computer shown in FIG. 2 in the wireless communications, or may be transferred via the LAN (Local Area Network) and the network 2 to the computer shown in FIG. 2 for installation in wired communication.

Figure 3:
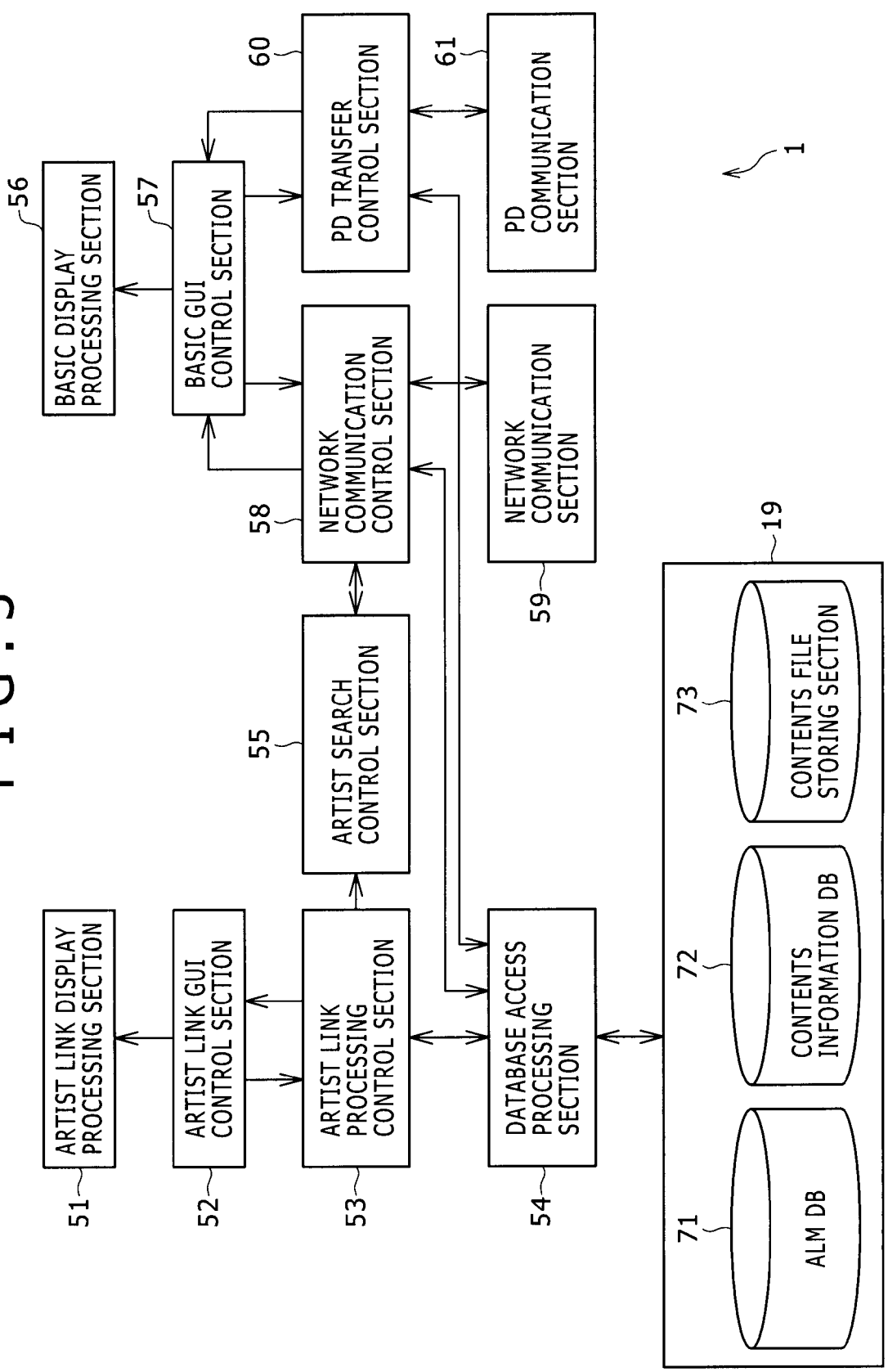
FIG. 3 is a block diagram illustrating an example of a functional configuration of the PC shown in FIG. 1.

FIG. 3 is a block diagram showing an example of a functional configuration of the PC1. The functional blocks shown in FIG. 3 are realized when contents of a music piece is registered and a program is executed for selecting and listening the registered contents.

The functional blocks shown in FIG. 3 includes an ALM database 71, a contents information database 72, and a contents file storing section 73. These 71, 72 and 73 include an artist link display processing 51, an artist link GUI control section 52, an artist link processing control section 53, a database access processing section 54, an artist search control section 55, a basic display processing section 56, a basic GUI control section 57, a network communication control section 58, a network communication section 59, a PD (Portable Device) transfer control section 60, a PD (Portable Device) communication section 61, and the storage section 19.

The artist link display processing 51 generates GUI images constituting an artist link map editing screen 201 (FIG. 9) used for editing or referring to the artist link information under controls by the artist link GUI control section 52 and based on the artist link information, and displays the artist link map editing screen 201 or the like configured with the generated images on the display section 17.

The artist link GUI control section 52 controls the artist link display processing 51 to generates GUI images for the artist link map editing screen 201 or the like based on the artist link information from the artist link processing control section 53 or to update the artist link map editing screen 201 or the like based on a feedback from the artist link processing control section 53. Furthermore the artist link GUI control section 52 makes the artist link processing control section 53 execute processing for artist link information by inputting an operation signal corresponding to a user's operation relating to the artist link map editing screen 201 via the operation input section 16.

The artist link processing control section 53 executes processing for the artist link information stored in an ALM database 71 in response to control by the artist link GUI control section 52 or data from the database access processing section 54, or the processing using the artist link information.

When detailed metadata is supplied from the database access processing section 54, the artist link processing control section 53 generates artist link information based on the detailed metadata, supplies the generated artist link information to the database access processing section 54 for registration in the ALM database 71.

As described above, the detailed metadata includes a contents ID of contents, names of artists appearing in the contents, names of subgenres to which similar contents is classified, and the like, and therefore a correspondence between the artist names in the contents and the subgenres can be acquired from the detailed metadata. Then the artist link processing control section 53 determines that the artists classified (belonging) to the same subgenres are relating to each other, and generates the artist link information in which an artist group is correlated to the artists.

In other words, the artist link information is information correlating artists belonging to the same artist group, and can be edited according to the necessity. Therefore, when an artist A belongs is a member of an artist B (group), when the artist A was a member of the artist B (group), when the artist A has some connected with an artist C, or when the artist A provides some music pieces to an artist D, it is determined that the artists A, B, C, and D have some connections with each other. In this case, a particular artist group is prepared, and the artists are correlated to the artist group.

Therefore, the artist link processing control section 53 performs editorial works such as addition or deletion of the artist link information managed in the ALM database 71 by the database access processing section 54 under control by the artist link GUI control section 52, and also returns the updated artist link information reflecting a result of the editorial works to the artist link GUI control section 52.

The artist link processing control section 53 acquires a name of an artist specified by a user from the artist link information managed in the ALM database 71 by the database access processing section 54 under control by the artist link GUI control section 52, and execute data search from the contents server 3 using the acquired artist name by controlling the artist search control section 55.

The database access processing section 54 executes read/write operations for the data stored in the ALM database 71, the contents information database 72, and the contents file storing section 73 according to instructions from the artist link processing control section 53, the PD (Portable Device) transfer control section 60, the network communication control section 58, or other related sections.

The artist search control section 55 generates search demand data for demanding data search from the contents server 3 by using an artist name from the artist link processing control section 53, and has the generated search demand data sent through the network communication control section 58. Furthermore, the artist search control section 55 receives a result of data search from the contents server 3 from the network communication control section 58, decides data specifying a display site in the contents server 3 (such as a URL (Uniform Resource Locator as the display site), and sends data specified the decided site for display to the network communication control section 58.

The basic display processing section 56 generates GUI images for basic functions of a particular program, and has a screen including the generated GUI images or images corresponding to screen data supplied from the contents server 3 in the display section 17 under controls by the basic GUI control section 57.

The basic GUI control section 57 genrates GUI images for basic functions or updates a screen or the like including the GUI images for the basic functions based on a feedback from the PD transfer control section 60 and the network communication control section 58. Furthermore, the basic GUI control section 57 inputs and supplies an operation signal corresponding to a user's operation for the GUI image for basic function via the operation input section 16 to the PD transfer control section 60, the network communication control section 58, or other related sections, or supplies images corresponding to screen data supplied from the contents server 3 via the network communication control section 58 on a monitor constituting the output section 17.

The network communication control section 58 controls the network communication section 59 in response to the operation signal from the basic GUI control section 57 to access the contents server 3 or the detailed metadata server 5, or to send search demand data of data for a display site from the artist search control section 55 to the contents server 3. Furthermore, the network communication control section 58 supplies screen data supplied from the contents server 3 to the basic GUI control section 57, supplies a result of search acquired from the contents server 3 to the artist search control section 55, or supplied contents data and metadata acquired from the contents server 3 or the detailed metadata acquired from the detailed metadata server 5 to the database access processing section 54.

The PD (Portable Device) transfer control section 60 makes the database access processing section 54 read out data specified to be transferred (such as contents data, metadata, edited artist link information, or a play list in which a sequence of contents reproduction is described) in response to an operation signal from the basic GUI control section 57 and send the data to the PD7 controlling the PD communication section 61.

The PD communication section 61 sends data supplied from the PD transfer control section 60 via the communication section 20 as well as a USB cable not shown to the PD7. The network communication section 59 accesses the contents server 3 or the detailed metadata server 5 via the network communication section 59, a communication section 20, and the network 2 and supplies screen data, a result of search or contents data or metadata and a detailed metadata acquired from the detailed metadata server 5 to the network communication control section 58.

Artist link information for various artists is stored in the ALM database 71. The artist link information stored in the ALM database 71 is generated by the artist link processing control section 53 based on the detailed metadata acquired from the detailed metadata server 5, and is subjected to editorial works such as addition or deletion in response to a user's operation.

Information concerning contents (contents information) is stored in the contents information database 72. The contents information database 72 stores therein information such as contents names, contents file names, history data of times of reproduction and history log data for transfer to a PD in the correlated state. The contents information registered in the contents information database 72 is displayed, for instance, as my library data, on the screen. Also the play list information prepared according to the user's operation (including a play list name and a contents ID to which the play list belongs) is also stored in the contents information database 72. Also a subgenre name for detailed metadata may be stored as one of metadata in the contents information database 72 in correspondence to the contents ID.

Contents data is stored, as a contents file managed in the contents information database 72, in the contents file storing section 73.

Figure 4:
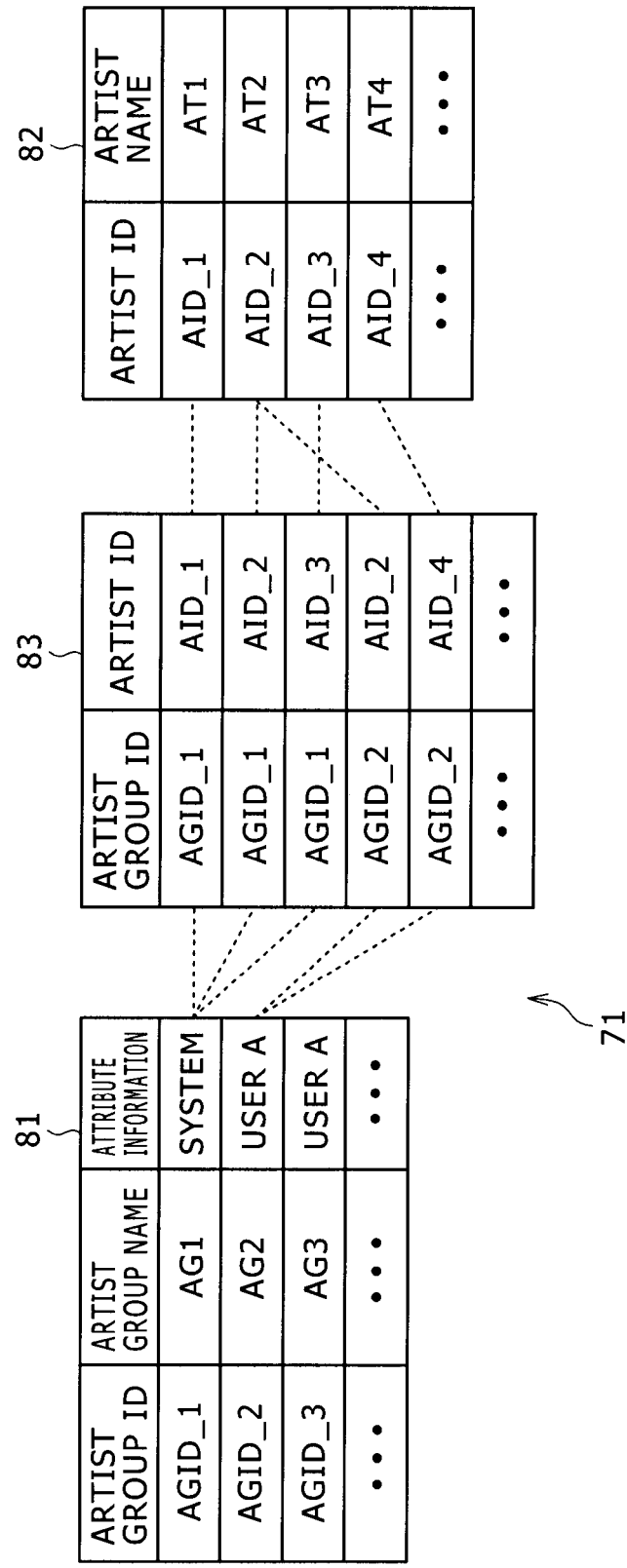
FIG. 4 is a view illustrating an example of a configuration of an ALM database shown in FIG. 3.

FIG. 4 illustrates an example of a configuration of the ALM database 71.

In the example shown in FIG. 4, the ALM database 71 includes an artist group (AG) list table 81, an artist list table 82, and an artist link correspondence table 83.

The artist group list table 81 includes an artist group ID (Identification), an artist group name, and attribute information. The artist group name is a name representing a category for classification of artists correlating to each other, and can freely be changed or newly added by a user. When the artist group name is prepared based on the detailed metadata, the subgenre name is registered as it is as the artist group name.

The attribute information represents by whom the artist group is prepared. For instance, the user A represents that the artist group name is prepared by a user of the PC1, and system represents that the artist group is prepared based on detailed metadata by the artist link processing control section 53. The attribute information prepared by a user is processed in preference to that prepared, for instance, by system.

The artist group list table 81 shown in FIG. 4 stores therein the information that an artist group ID for the artist group "AG1" is "AGID_1" and attribute information thereof is "system", the information that an artist group ID for the artist group "AG2" is "AGID_2" and attribute information thereof is "user A", and the information that an artist group ID for the artist group "AG3" is "AGID_3" and attribute information thereof is "user A". In other words, in the artist group list table 81, artist group IDs and an artist group names are stored in the correlated state. The artist group "AG1" is prepared by the artist link processing control section 53, while the artist groups "AG2" and "AG3" are prepared by the user of the PC1.

The artist list table 82 includes artist IDs and artist names. In the artist list table 82 shown in FIG. 4, the artist ID of "AT1" is correlated to "AID_1", the artist ID of "AT2" to "AID_2", the artist name of "AT3" to the "AID_3" respectively. Thus the artist IDs and the artist names are stored in the correlated state.

The artist link correspondence table 83 includes artist group IDs and artist IDs. In the artist link correspondence table 83 shown in FIG. 4, the artist group ID "AGID_1" includes the artist ID "IAD_1", the artist ID "AID_2", and the artist ID "AID_3"; the artist group ID "AGID_2" includes the artist ID "AID_2" and the artist ID "AID_4". Thus the artist group IDs and the artist IDs are stored in the correlated state.

Namely, in the artist link correspondence table 83, one artist group ID can include a plurality of artist IDs, and also a plurality of artist groups can include the same artist ID.

As described above, by referring to the artist link information, including the artist group list table 81, the artist list table 82, and the artist link correspondence table 83, it is understood that the artist AT1 with the artist ID of "AID_1", the artist AT2 with the artist ID of "AID_2", and the artist AT3 with the artist ID of "AID_2" are included in the artist group AG1 with the artist group ID of "AGID_1". Furthermore it is understood that the artist AT2 with the artist ID of "AID_2" and the artist AT4 with the artist ID of "AID_4" are included in the artist group AG2 with the artist group ID of "AGID_2".

Namely, the artist link information suggests that the artist AT1 with the artist ID of "AID_1", artist AT2 with the artist ID of "AID_2", and the artist AT3 with the artist ID of "AID_3" have some connection with each other, and also that the artist AT2 with the artist ID of "AID_2" and the artist AT14 with the artist ID of "AID_4" have some connections with each other.

It is to be noted that artists with the corresponding contents not registered in the contents information database 72 are also included in the artists registered in the ALM database 71. The configuration is described with reference to FIG. 9, but anyhow the artist link information can be edited and also additional artist link information can be acquired from the outside and added to the artist link information.

FIG. 5 illustrates a more detailed configuration of the artist link correspondence table 83. In the example shown in FIG. 5, the artist link correspondence table 83 includes order information and attribute information in addition to the artist group IDs and artist IDs shown in FIG. 4.

The order information is an order of priority referred to, for instance, when the artist link information is transferred to the PD7 having a small memory capacity as compared to that of the PC1, or when artists included in an artist group are displayed side by side in the display section 17, and the order information can be changed by a user. For instance, the configuration is allowable in which artist at only upper 20 ranks in the order of priority among those included in an artist group are transferred to the PD7.

The attribute information included in the artist link correspondence table 83 indicates by whom an artist is added to an artist group. AS described above, the user A indicates that the attribute information is prepared by a user of the PC1, and "system" indicates that the attribute information is prepared by the artist link processing control section 53 based on the detailed metadata. Furthermore the user B indicates that the attribute information is prepared by a user of another PC1. This attribute information is referred to as an initial value of the order information.

Namely, to treat a user's desire more preferentially than detailed metadata, an initial value of each other information is decided by the attribute information. More specifically, the attribute information is treated in the following order of priority: User A (user of the PC1)>User B (the user's friend)>"system".

The artist link correspondence table 83 shown in FIG. 5 stores therein artist IDs included in the artist group AG1 with the artist group ID of "AGID_1". Namely the order information of "1" and the attribute information of "user A" are stored in the correlated state in the artist AT1 with the artist ID of "AID_1". Furthermore the order information of "2" and the attribute information of "user B" are stored in the correlated state in the artist AT2 with the artist AT2 with the artist ID of "AID_2" included in the artist group AG1 with the artist group ID of "AGID_1". In the artist AT3 with the artist ID of "AID_3" included in the artist group AG1 with the artist group ID of "AGID_1", the order information of "3" and the attribute information of "system" are stored in the correlated state.

It is understood that, among the artists included in the artist group AG1 with the artist group ID of "AGID_1", a priority of the artist with the artist ID of "AID_1" is the highest, while a priority of the artist AT3 with the artist ID of "AID_3" is the lowest. Furthermore, the artist link information indicating that the artist AT1 is included in the artist group AG1 is prepared by the user A, the artist link information indicating that the artist AT2 is included in the artist group AG1 is prepared by the user B, and the artist link information indicating that the artist AT3 is included in the artist group AG1 is prepared by the "system".

The case of the artist group AG1 is described below more specifically with reference to the attribute information in the artist group list table 81 shown in FIG. 4. For instance, after the artist group AG1 and the artist link information indicating that the artist AT3 is included in the artist group AG1 are prepared by the artist link processing control section 53, the artist link information indicating the artist AT1 is included in the artist group AG1 is added through an editorial work performed by the user of the PC1. Then the artist link information is fetched a file including the artist link information for a user of other PC1 (although the mechanism is described in detail below), and when the information is merged, the artist link information indicating the artist AT2 is included in the artist group AG1 is added.

Furthermore in the artist link correspondence table 83, the order information of "2" and the attribute information of "user A" are stored in the correlated state in the artist AT2 with the artist ID of "AID_2" included in the artist group AG2 with the artist group ID of "AGID_2". The order information of "1" and the attribute information of "user A" are stored in the correlated information in the artist AT4 with the artist ID of "AID_4" included in the artist group AG2 with the artist group ID of "AGID_2".

It is understood that, of the artists included in the artist group AG2 with the artist group ID of "AGID_2", a priority of the artist AT4 with the artist ID of "AID_4" is set at the highest order, while the artist AT2 with the artist ID of "AID_2" is set at the lowest order. Furthermore, it is understood that the artist link information indicating that the artist AT2 is included in the artist group AG2 is prepared by the user A, and also the artist link information indicated by the artist AT4 is included in the artist group AG2 is prepared by the user A.

FIG. 6 illustrates an example of the contents information table stored in the contents information database 72.

The contents information table includes contents ID each identifying contents (a music piece), contents names, name of albums in which the contents is included, name of artists who play or provide the contents, names of genres to which the contents belongs, names of contents file of contents respectively, and attribute information for the contents such as a flag indicating that the contents has been reproduced. This reproduction-completed flag is once rest to "0" when the contents is shuffled and then again reproduced in a random manner, and then "1" is set in the reproduction-completed flag for the contents selected to be reproduced. With this configuration, it is possible to prevent contents once reproduced from being selected for reproduction again.

For instance, the contents information table shown in FIG. 6 stores therein the contents information indicating that a contents name of the contents with the contents ID of "TID_1" is "Song1", the album name is "Album1", the artist name is "Artist AT1", the genre name is "Pops", the contents file name is "Song1.oma", and the reproduction-completed flat is "0".

The contents information table furthermore stores therein the contents information indicating that a contents name of the contents with the contents ID of "TID_2" is "Song2", the album name is "Album1", the artist name is "Artist AT1", the genre name is "Pops", the contents file name is "Song2.oma", and the reproduction-completed flag is "0". The contents information table also stores therein the contents information indicating that a contents name of the contents with the contents ID of "TID_3" is "Song3", the album name is "Album2", the artist name is "Artist AT2", the genre name is "Rock", the contents file name is "Song3.oma", and the reproduction-completed flag is "0".

Although not shown in FIG. 6, as described above, a tempo, a tune, and rhythm of contents, chronological data (such as on-sale date), ranking information, history data of times of reproduction, history log data for transfer to a PD, and play list name and the like are also stored in correspondence to the contents ID. The ranking information includes such data as ranking of sales in the market, ranking of user access to the contents server 3, and the like.

For instance, when the contents is image contents, a title of a program, a title of a moving picture, and chronological data such as a released date) are included in the contents information database 72. Furthermore, an assessment value for rating the contents prepared in response to user's operation in the operation input section 16 can be stored as comments metadata in the contents information database 72. Preparation of the assessment value may be performed either before or after the contents is viewed.

Figure 7:
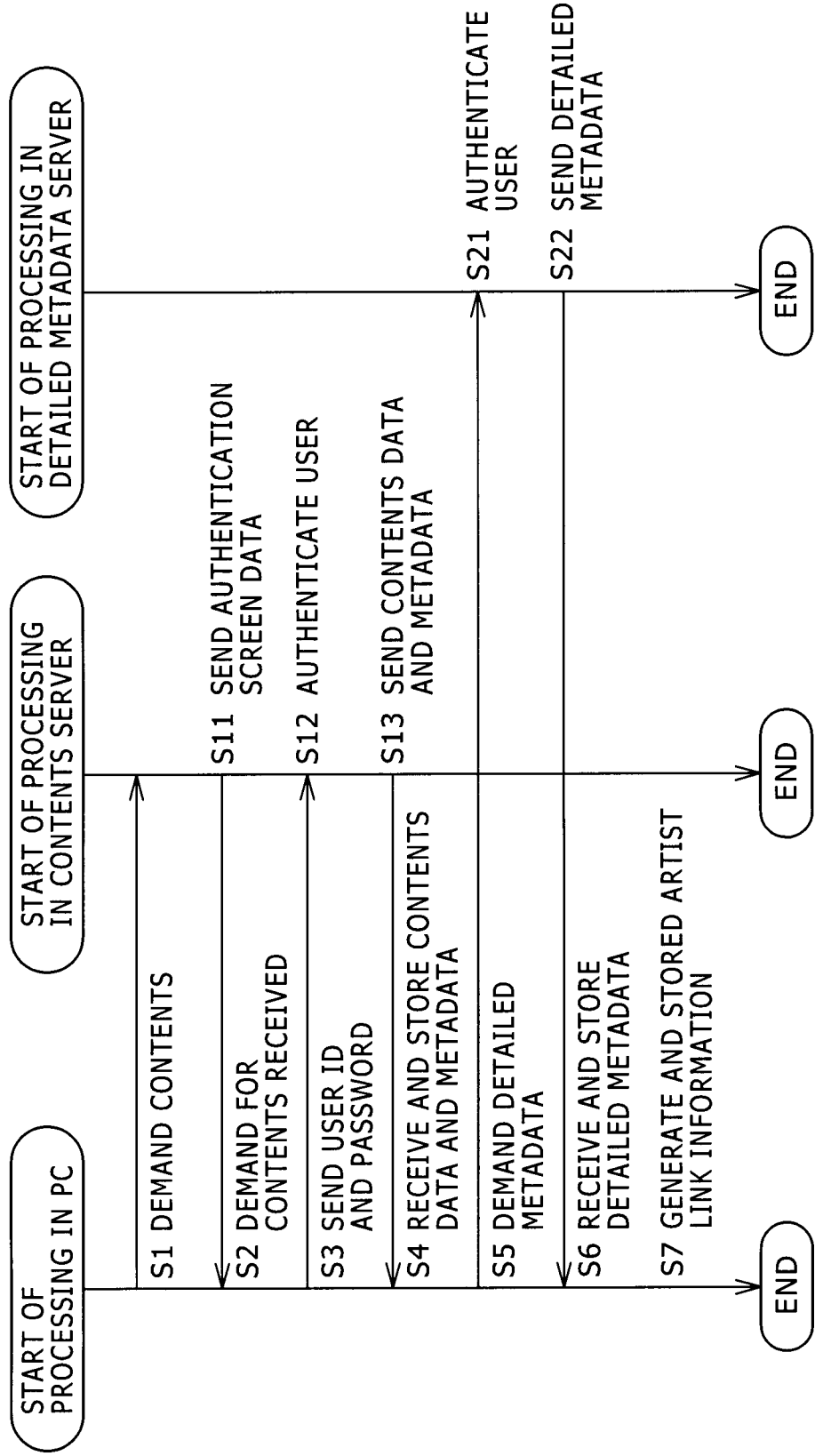
FIG. 7 is a flow chart illustrating an example of a processing performed in the contents provision system shown in FIG. 1.

Next descriptions are provided, by referring to the flow chart shown in FIG. 7, for a process performed in the PC1 for acquiring contents data from the contents server 3, acquiring detailed metadata from the detailed metadata server 5, and generating artist link information.

In the following description, it is assumed that a contents list is displayed in the display section 17. A user demands an access to the contents server 3 by specifying a desired contents using a mouse or the like constituting the operation input section 16 of the PC1.

The basic GUI control section 57 inputs a signal corresponding to a user's operation via the operation input section 16, and supplies the signal to the network communication control section 58. In step S1, the network communication control section 58 controls the network communication section 59 to access the contents server 3 for demanding a contents desired by the user. The network communication section 59 accesses the contents server 3 via the communication section 20 and the network 2 to demand the contents desired by the user.

When the communication section 20 in the contents server 3 is accessed by the PC1, the communication section 20 sends, in step S11, authentication screen data for demanding a user ID (Identification) and a password previously registered therein via the network 2 under the controls by the CPU 11 for utilizing the contents provision system.

The network communication section 59 in the PC1 receives, in step S2, authentication screen data from the contents server 3 via the communication section 20 and the network 2, and supplies the received authentication screen data via the network communication control section 58 to the basic GUI control section 57. The basic GUI control section 57 controls and makes the basic display processing section 56 display the authentication screen corresponding to the authentication screen data from the network communication control section 58 on the display section 17. The user inputs a user ID and a password using a mouse or the like constituting the operation input section 16 in response to the authentication screen displayed in the display section 17.

The basic GUI control section 57 inputs the user ID and the password via the operation input section 16 in response to the user's operation, and supplies the received user ID and the password to the network communication control section 58. The network communication control section 58 controls and makes the network communication section 59 send the user ID and the password from the basic GUI control section 57 to the contents server 3. The network communication section 59 sends the user ID and the pass word via the communication section 20 and the network 2 to the contents server 3.

The communication section 20 in the control server 3 receives the user ID and the password from the PC1, and supplies the received user ID and the password to the CPU 11. In step S12, the CPU 11 authenticates the user of the PC1 based on the user ID and the password received from the communication section 20, and then proceeds to step S13. In step S13, the communication section 20 reads out contents data and metadata for contents desired by the user from among various and diversified contents stored in the contents database 4, and sends the contents data and the metadata read out as described above via the network 2 by controlling the communication section 20.

The network communication section 59 in the PC1 receives, in step S4, the contents data and the metadata from the contents server 3 via the communication section 20 and the network 2, supplies the received contents data and metadata via the network communication control section 58 to the database access processing section 54 to stores the contents data and the metadata in the contents file storing section 73 and in the contents information database 72 respectively. Namely, the database access processing section 54 stores the contents data as a file in the contents file storing section 73, and also registers the stored contents file name, metadata, and the like as contents information in the contents information database 72. Herein, information for the contents registered in the contents information database 72 is displayed as my library on the screen.

In step S5, the network communication control section 58 controls and makes the network communication section 59 access the detailed metadata server 5 and demand detailed metadata for the contents acquired from the contents server 3. The network communication section 59 accesses the detailed metadata server 5 via the communication section 20 and the network 2, sends a contents ID for the contents stored in the PC1, and demand detailed metadata for the contents.

When the communication 20 in the detailed metadata server 5 is acceded by the PC1, the CPU 11 authenticates the user in step S21. When using the detailed metadata server 5 for the first time, at first user registration is demanded. Therefore, when a user of the PC1 has been registered, the CPU 11 authenticates the user of the PC1, procedes to step S33, reads out, of the various and diversified contents stored in the contents details metadata database 6, detailed metadata for the contents ID desired by the user, and controls and makes the communication section 20 send the read-out detailed metadata via the network 2. When the user has not been registered, user registration is demanded to the user.

In step S6, the network communication section 59 in the PC1 receives detailed metadata from the detailed metadata server 5 via the communication section 20 and the network 2, and supplies the received detailed metadata to the network communication control section 58. The network communication control section 58 controls and makes the database access processing section 54 correlate the detailed metadata to the contents, store the detailed metadata in the contents information database 72, and also supply the detailed metadata to the artist link processing control section 53.

In step S7, the artist link processing control section 53 generates artist link information based on the detailed metadata from the detailed metadata server 5, and controls and makes the database access processing section 54 store the generated artist link information in the ALM database 71.

The detailed metadata includes, for instance, a content ID for contents, genre information, sub-genre information, artist name, and the like. The detailed metadata is not limited to information for genres, and may be information for further classification of other metadata (such as "Tempo" indicating Bpm of contents, "Major" indicating whether a tune of the contents is major or miner, "RythmRatio (ratio of rhythm)" indicating whether rhythm of the contents is percussive or quiet. Further, other metadata may also be "HiMid (high frequency area)" indicating whether a diapason of the contents is high or low, "year" indicating a year when the contents was released (put into the market), "ranking" indicating a ranking of accesses by users). The analysis data for the contents may be used as the detailed metadata. The analysis data means data obtained by analyzing a tempo of contents, a general tune of contents (major or miner), rhythm of contents (a use rate of percussion instruments, and other parameter of each contents.

The artist link processing control section 53 treats the sub-genre as an artist group, correlates the sub-genre to an artist group ID, registers the sub-genre in the artist group list table 81, and registers an artist of contents in the artist lest table 82 correlated with the artist ID. The artist link processing control section 53 furthermore registers each ID in the artist link correspondence table 83 so that names of artists included in contents classified to the sub-genre is included in the artist group corresponding to the sub-genre.

When the sub-genre has been registered as an artist group, artists with the contents classified to the sub-genre are added to the registered artist group.

As described above, in the PC1, artist link information is prepared based on the detailed metadata acquired from the detailed metadata server 5, and the prepared artist link information is stored in the ALM database 71.

The description above assumes a case in which detailed metadata is acquired when the PC1 acquires contents data, but also the configuration is allowable in which the contents information database 72 is searched when the PC1 is activated, or at a predetermined time interval and the detailed metadata not having been fetched into the PC1 is acquired.

Figure 8:
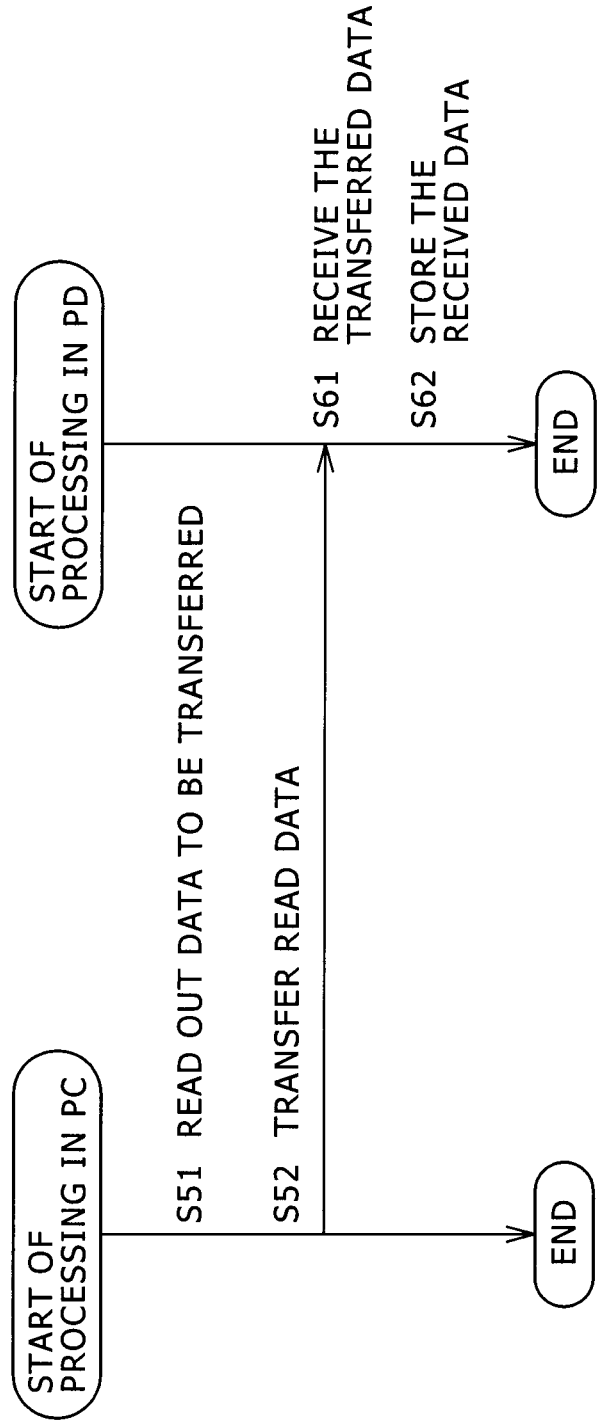
FIG. 8 is a flow chart illustrating another example of a processing performed in the contents provision system shown in FIG. 1.

An example of the processing in the contents provision system illustrated in FIG. 1 for the transfer of the data from PC1 to PD7 is described by referring to a flow chart in FIG. 8. The PD7 includes, as in the PC1, the artist link display processing section 51 and the database access processing section 54, the ALM database 71 configured in the recording section 19, the contents information database 72, and the contents file storing section 73, though not shown.

PD7 is connected to the USB cable (not shown) via the PC1, and the transfer button for specifying, for example, the data transfer to the PD7, is displayed on the display section 17 of the PC1. The user, by using the mouse constituting the operation input section 16 of the PC1, click the transfer button, and selects the contents to be transferred to the PD7.

The basic GUI control section 57, by the input of the operation signals corresponding to the user's operation via the operation input section 16, and provides the signals to the PD communication section 60. In step s51, the PD communication section 60 controls the database access processing section 54, and responding to the operation signals from the basic GUI control section 57, reads out the data for the contents desired by the user from the ALM database 71, the contents information database 72, and the contents file storing section 73.

The PD transfer control section 60 controls the database access processing section 54, and enables the read out of the data for the contents desired by the user. The database access processing section 54 refers to the contents information database 72, reads out the data for the contents desired by the user (metadata, for example), provides the metadata to the PD transfer control section 60, reads out, through the contents file name included in the metadata, the contents file stored in the contents file storing section 73, and provides the data (or the data for the contents) to the PD transfer control section 60.

When transferring the contents including the play list, the contents, the transfer of which is completed, of the status is identified by, for example, confirming the history log data for transfer to PD in the contents information database 72. Thus, the completion of the transfer is confirmed. In this case, the data for the contents are not read out, and the play list is exclusively transferred.

The PD transfer control section 60, controls the database access processing section 54, and enables the read out of the artist link information corresponding to the artist names in the contents desired by the user read out from the contents information database 72 from the ALM database 71. The database access processing section 54 refers to the artist table 82 and the artist link correspondence table 83, reads out the artist group ID of the artist name for the contents desired by the user, reads out the artist group name corresponding to the artist group ID, then, from the artist group list table 81, reads out the artist group name corresponding to the artist group ID, reads out the data for the artist link information, and provides the data to the PD transfer control section 60.

In step s52, the PD transfer control section 60 enables the transfer of the data for the contents read out form the database access processing section 54 (data for the contents, metadata, and artist link information) to the PD communication section 61. In the step, PD transfer control section 60, as described above, based on the order information in the artist link correspondence table 83, enables the transfer of the information for the artists having the priority in the top 20, exclusively. In response to the above, PD communication section 60 transfers the data for the contents which the user demands to transfer via the communication section 20 and the USB cable to the PD7.

In step s61, the communication section 20 in the PD7, via the USB cable, receives the data for the contents from the PC1, and provides the data to the database access processing section 54. In step s62, the database access processing section 54 in the PD7 stores the data for the contents and the metadata in the contents file storing section 73 and the contents information database 72, respectively, and stores the artist link information to the ALM database 71 in the PD7.

The database access processing section 54, stores the contents as files to the contents file storing section 73, registers the contents ID, contents file name, metadata, and the like as contents information to the contents information database 72, and registers the artist link information from the PC1 to the ALM database 71.

As described above, the artist link information is stored in the ALM database 71, in the PD7 as well. Therefore, the editing process and the like in the PC1 as described below are executed in the PD7 as well.

Figure 9:
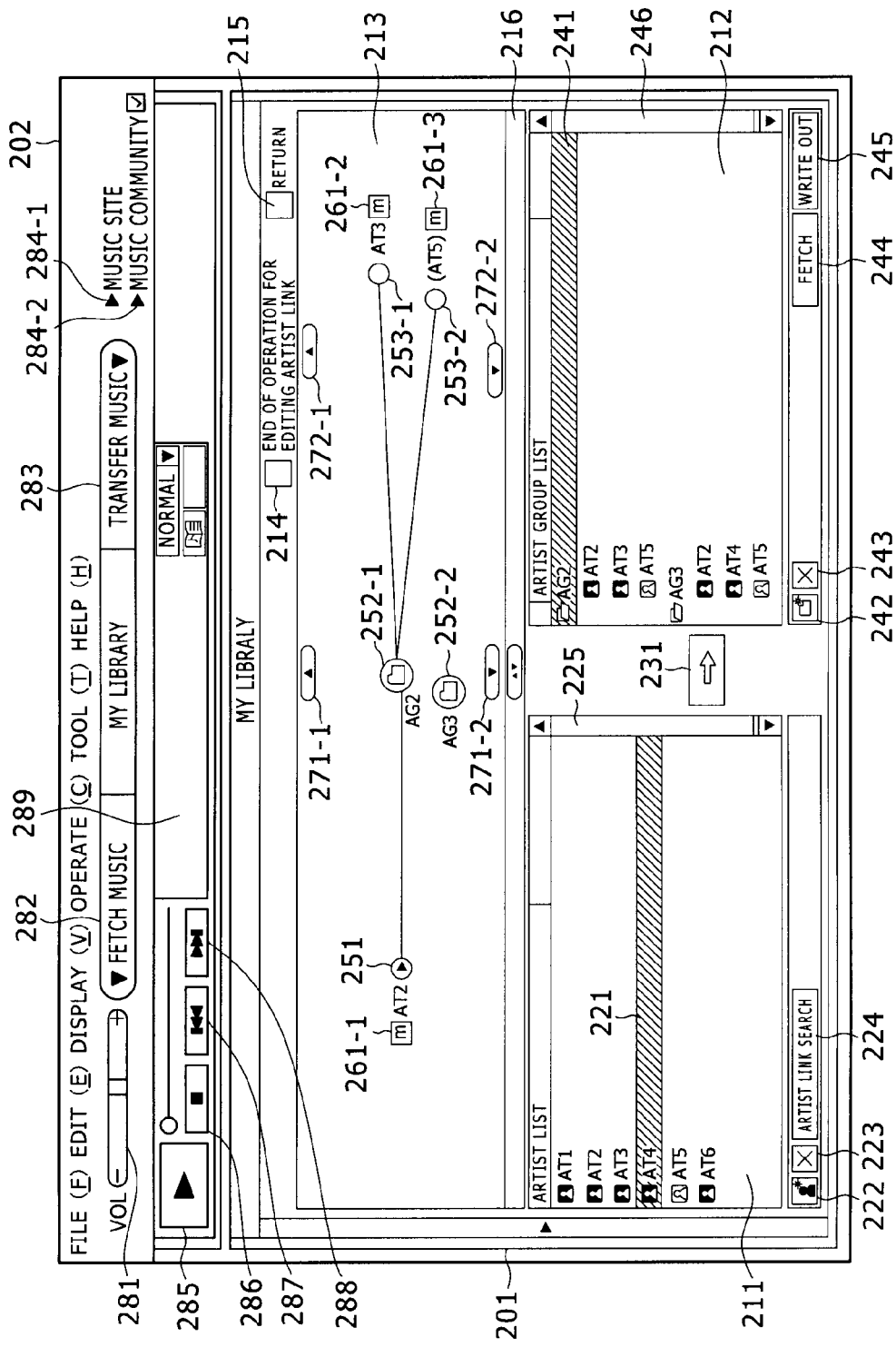
FIG. 9 is a view illustrating an example of a configuration of an artist link map editing screen.

FIG. 9 illustrates an example of a display screen displayed on the display section 17.

The display screen shown in FIG. 9 is divided to an area which is switched to other display screen in response to a user's operation, and to an area which is not switch and also in which a basic function display screen 202 is typically displayed. In the example shown in FIG. 9, an artist link map editing screen 201 is displayed in the area which can be switched to other display screen. Namely, the basic function display screen 202 follows controls by the basic display processing section 56, while the artist link map editing screen 201 follows controls by the artist link display processing section 51.

The artist link map editing screen 201 is largely divided to an artist list screen 211, an artist group list screen 212, and an artist link tree screen 213. As for the arrangement, the artist list screen 211 and the artist group list screen 212 are provided side by side under the artist link tree screen 213.

Provided in an upper portion of the artist link tree screen 213 are an artist link editing terminate button 214 for returning a screen display from the artist link map editing screen 201 to a screen for reproduction (for instance, a screen showing only the artist link tree screen 213), and a button 215 for returning to a preceding screen. In addition, provided between the artist link tree screen 213 and the artist list screen 211 or the artist group list screen 212 is a splitter bar 216 moved in the vertical direction for changing percentages displayed areas of artist link tree screen 213, the artist list screen 211, and the artist group list screen 212.

A result of the task for editing artist link information performed on the artist list screen 211 as well as on the artist group list screen 212 is immediately reflected to a display on the artist link tree screen 213. Furthermore, also an instruction of selection by a user or a result of the task for editing artist link information is immediately reflected to the artist group list screen 212.

Each of the screens is described in detail below. A list of the artist names (AT1 to AT6) stored in the artist list table 82 is displayed together with the artist icons. The artist icon correlated to the artist AT5 (sometimes referred to as an icon for the artist AT5 in the following description) is displayed with a color different from those of icons for the other artists. The different color indicates that contents data for the artist AT5 is not stored in the contents file storing section 73, and that information for the contents has not been registered in the contents information database 72. A cursor 221 indicating selection by a user is displayed above the icon for the artist AT4.

In the lower portion of the artist list screen 211, the button for adding the artist 222 for adding the new artist to the artist list table 82, the button for deleting the artist 223 for deleting the artist selected by the cursor 221 from the artist list table 82, and the artist link search button 224 for enabling the display of the artists link information, in which the artist selected by the cursor 221 is configured as starting artist to the artist link tree screen 213, are arranged. In the right side portion of the artist list screen 211, the scroll bar 225 for scrolling the artist list displayed on the screen 211 is arranged.

Between the artist list screen 211 and the artist group list screen 212, the button for adding the artist group 231 for adding the artist selected by the cursor 221 in the artist list screen 211 to the artist group selected in the artist group list screen 212 is arranged.

In the artist group list screen 212, the list of the artist group stored in the artist group list table 81 (in the example, the artist group AG2 and AG3) is displayed with the respective folder icons. The folder icon respective to the artist group AG2 (referred as the folder icon for the artist group AG2, hereinafter) is displayed in a color different from other artist groups. The display is for representing the fact that the artist included in the artist group AG2 is configured as the starting artist, and the artist link information is displayed on the artist link tree screen 213. On the icon for the artist group AG2, the cursor 241 is displayed, for representing the fact that the group is selected by the user.

In the artist group list screen 212, the folder icon is displayed as a closed folder, in the default configuration. By clicking the closed icon, the opened icon is displayed, the information in the artist link correspondence table 83 is referred, and the icon for the artist included in the respective artist group is displayed in the opened folder icon. In the example illustrated in FIG. 9, the folder icons for the artist groups AG2 and AG3 are opened, and the icons for the artists included in each artist group are displayed respectively to the order information in the artist link correspondence table 83.

In the example illustrated in FIG. 9, the icons for the artists AT2, AT3, and AT5 included in the artist group AG2 are displayed in the folder for the artist group AG2, and the icons for the artists AT2, AT4, and AT5 included in the artist group AG3 are displayed in the folder for the artist group AG3. The artist groups other than the artist group AG3 are controlled, but there is not enough displaying space in the example, so the artist groups are not displayed in the artist group list screen 212, and for example, by the user's operation of the scroll bar 246 and the like, the group is displayed on the artist group list screen 212.

In the artist group list screen 212, through the operation of the mouse composing the operation input section 16 and the like, the order of the artists included in each artist group can be modified, enabling the order of the artists on the artist link tree screen 213 to be respectively modified. Thus, the priority of the artists included in the artist group corresponding to the artist link correspondence table 83 (or the order information) can also be modified.

In the lower portion of the artist group list screen 212, the button for adding the artist group 242 to the artist group list table 81 as a new artist group is arranged. Furthermore, the button for deleting the artist group selected by the cursor 241 form the artist group list table 81 or for deleting the artist selected by the cursor 241 from the respective artist group, and the fetch button 244 for including data written out to the XML (Extensible Markup Language) file, and the write out button 245 for the write out of the artist link information for at least one artist group selected by the cursor 241 are arranged. In the right side portion of the artist group list screen 212, the scroll bar 246 for scrolling the artist group list displayed on the screen 212 is arranged.

On the artist link tree screen 213, in response to the user's operation, the artist link information for the starting artist is displayed as the tree format.

More specifically, in the artist link tree screen 213, the starting icon 251 for the representation of the starting artist on the left side portion, the folder icons 252-1 and 252-2 for the representation of the artist group including the starting artist on the center portion, and the co-relational icons 253-1 and 253-2 for the related other artist included in the focused artist group in the artist groups including the starting artist on the right side portion are displayed. Between the starting icon 251 and the folder icons 252-1 and 252-2, the line for representing the link for relating the icons is displayed. The line is displayed for representing the link for relating the folder icon 252-1 and the co-relational icons 253-1 and 253-2 as well.

The folder icons 252-1 and 252-2 are not distinguished from each other unless necessary and are referred simply as the folder icon 252, hereinafter. The co-relational icons 253-1 and 253-2 are not distinguished from each other unless necessary and are referred simply as co-relational icon 253.

In the artist link tree screen 213, as described above, the artist group is displayed so that the user can identify the parameter for the relation of the starting artist and the co-relational artist. When there is a plurality of the artist groups including the starting artist, a plurality of folder icons 252 are displayed. When there is a plurality of the co-relational artist are included in the artist group, a plurality of the co-relational icons 253 are displayed.

In the example illustrated in FIG. 9, the artist AT2 is selected as the starting artist, and thus the character string for the artist AT2 is included in the starting icon 251, and the character strings for the artist group AG2 and AG3 including the artist AT2 are included in the folder icons 252-1 and 252-2, respectively. The character strings for the other artists AT3 and AT5 included in the artist group AG2 are included in the co-relational icons 253-1 and 253-2, respectively.

In the example illustrated in FIG. 9, the character string for the artist AT5 included in the co-relational icon 253-2 is shown in the parenthesis. The contents for the artist AT5 is not stored in the contents file storing section 73 (nor in the contents information database 72), and, as shown in FIG. 9, the character string is in a gray out display.

In the artist list screen 211, when the artist link search button 224 is clicked through the operation of the mouse constituting the operation input section 16 and the like, or, in the artist link tree screen 213, when the co-relational icon 253-1 is clicked, the artist AT3 represented by the co-relational icon 253-1 is configured to be the starting artist, and the artist link information for the starting artist is displayed on the artist tree screen 213 based on the ALM database 71.

Namely, in the displayed artist link tree 213, characters of the artist AT3 regarded as a starting artist is displayed with a starting icon 251, the characters of the artist group AG2 in which the artist AG3 is included is displayed with a folder icon 352, and characters of other artists (AT2 and AT5 grayed out in this case) included focused artist group (artist group AG2 in this case) are displayed with a correlation icon 253.

On this artist link tree screen 213, when the artist group AG3 is focused, for instance, in response to a user's operation in the operation input section 16, on the artist group list screen 212, scrolling is performed so that a folder icon for the artist group AG3 is arranged at a top position of the artist group list screen 212, and the icon is displayed with a color different from that of other artist groups. On the other hand, a folder icon for the artist group AG2 not on focus is displayed with the same color as other artist groups.

On the artist link tree screen 213, when the starting icon 251 is the co-relational icon 253 is selected (for instance, by double-clicking), for instance, in response to an operation of a mouse or the like constituting the user's operation input section 16, contents data for the artist indicated by the selected icon is reproduced. In this step, the artist indicated by the co-relational icon 253 is regarded as a starting artist, and artist link information for the artist regarded as a starting artist is displayed with a tree format based on the ALM database 71.

When the contents for the artist represented by the double-clicked icon are not stored in the PC1, the artist corresponding to the icon is configured to be the starting artist, and the artist link information is displayed as the tree format, based on the ALM database 71, but the contents is not reproduced.

In the artist link tree screen 213, in the area nearby the icons for each of the artists, namely, in the left side of the starting icon 251, and in the right side of the co-relational icons 253-1 and 253-2, the music site icons 261-1, 261-2, and 261-3 including the alphabetical character "m", corresponding to the starting icon and the co-relational icon, respectively. Hereinafter, the music site icons 261-1, 261-2, and 261-3 are not distinguished from each other unless necessary and are referred simply as music site icons 261.

Figure 13:
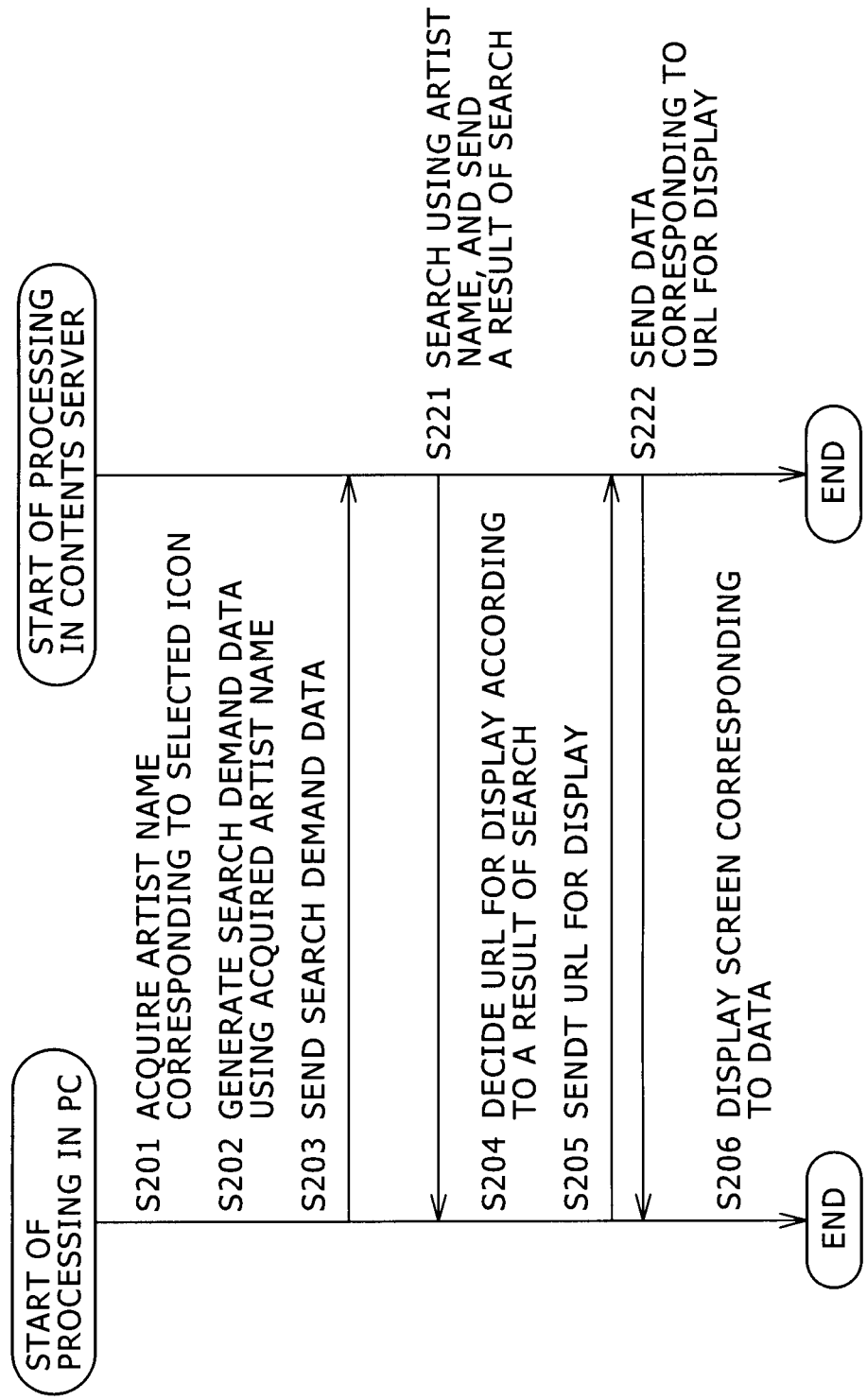
FIG. 13 is a flow chart illustrating a processing directly performed by the PC1 shown in FIG. 1 for searching contents from a content server.

The details of the music site icons 261 will be described below, in reference to FIG. 13. When each of the music site icons 261-1, 261-2, and 261-3 is selected, the search request for each artist corresponding to the respective icon is directly executed for the contents server 3, and thus, as illustrated in FIG. 9, in the area in which the artist link map editing screen 201 is displayed, the search result screen 301 (described in reference to FIG. 17 below) for displaying the result of the search for the artist in the contents server 3 using the selected artist name as the search key is displayed.

The request for searching the artist is directly executed for the contents server 3, regardless of whether the contents for the artist corresponding to the selected music site icons 261 is stored in the contents file storing section 73 or not (namely, stored in the contents information database 72 or not).

In the upper and lower portion of the folder icon 252 in the artist link tree screen 213, the scroll buttons 271-1 and 271-2 for shifting the display to the folder icon representing other artist groups including the starting artist are arranged, respectively, and in the upper and lower portion of the co-relational artist icon 253, the scroll buttons 272-1 and 272-2 for shifting the display to the co-relational icons representing other co-relational artists are arranged, respectively.

In the artist link tree screen 213, for example, through the operations of the mouse constituting the operation input section 16, the order of the co-relational icons can be changed, and thus changing the priority of the artists included in the artist group corresponding to the artist link correspondence table 83 shown in FIG. 5 (the order information).

The basic function display screen 202, the display on which enabled by the basic display processing section 56, is displayed as to surround the screen such as the artist link map editing screen 201, the representation by which successively changes responding to the user's operations, or in the outer area of the screen.

The basic function display screen 202 includes the volume button 281 for adjusting the volume, fetching button 282 for fetching the contents (or storing through encoding) from the CD and the like, the transfer button 283 for transferring the contents, play list, and the like to the PD7, the music site button 284-1 for accessing the music site (namely, the contents server 3). The basic function display screen 202 further includes the music community button 284-2 for accessing the external server via the network 2 for communicating other users using the contents, the reproduce button 285 for specifying to reproduce when the contents is not reproduced and specifying to pause when the contents is reproducing, the stop button 286 for specifying to reproduce when the contents is reproducing. The basic function display screen 202 also includes the "behind" button 287 for specifying one contents before the reproducing contents, the "ahead" button 288 for specifying one contents after the reproducing contents, and an exhibition section 289 for exhibiting the contents name, artist name, images, and the like in reproducing.

The editing process for the artist link information in the PC1 executed by referring to the artist link map editing screen 201 is described below, in reference to the flow charts shown in FIG. 10 to 12.

When the user operates the operation input section 16, and specifies the artist link editing by the operation, the artist link map editing screen 201 shown in FIG. 9 is displayed through the control of the artist link GUI control section. For example, the user selects, by operating the operation input section 16, as represented by the cursor 221, in the artist list screen 211, the icon for the artist AT4, selects, in the artist group list screen 212, the icon for the artist group AG2 to which the artist AT4 is added, and then clicks the button 231 for adding the artist group.

In step s101, the artist link GUI control section 52 determines whether the addition of the artist to the artist group is instructed or not. When the operation signal corresponding to the click of the button 231 is input from the operation input section 16, the artist link GUI control section 52 determines the instruction for adding the artist to the artist group in step s101, and proceeds to the step S102.

In step s102, the artist link GUI control section 52 enables the editing of the artist link correspondence table 83. The artist link processing control section 53 controls the database access processing section 54, adds the artist information to the selected artist group in the artist link correspondence table 83. In the artist link correspondence table 83, the artist ID for the artist AT4 is added and registered by co-relating the ID to the artist group ID for the artist group AG2. The updated information in the artist link correspondence table 83 is provided to the artist link GUI control section 52.

In step s103, the artist link GUI control section 52 provides the updated information in the artist link correspondence table 83 from the artist link processing control section 53 to the artist link display processing section 51.

In step s104, the artist link display processing section 51, based on the updated information in the artist link correspondence table 83, re-draws the artist link map editing screen 201.

Thus, in the artist group list screen 212, the artist icon for under the artist AG2 is additionally displayed in the folder for the artist group AT4, and in the artist icons for the artist AT2, AT3, and AT5.

In the artist link tree screen 213, the display includes the co-relational icon for the artist AT4 (not shown) added to the co-relational icons 353-1 and 353-2 to which the character strings for other artists AT3 and AT5 included in the artist group is co-related to the folder icon 252-1 to which the artist group AG2 including the artist AT2 or the starting artist is co-related via the line.

Although in the case described above, the order information in the artist group is configured to be the lowest, the order can be configured for the highest and the intermediate.

As described above, the artist link tree screen 213 is immediately reflected respectively to the editing for the artist link information executed in the artist list screen 211 and the artist group list screen 212.

In step s101, when the addition of the artist to the artist group is not determined to be instructed, the step proceeds to the step S105.

In step s105, the artist link GUI control section 52 determines whether the deletion of the artist from the artist group is instructed or not. In the artist group list screen 212 in the artist link map editing screen 201 shown in FIG. 9, for example, by the use's operation of the operation input section 16, so that the cursor 241 is displayed on the icon for the artist AT4 included in the artist group AG3 (or the state in which the icon for the artist AT4 is selected is enabled), the deleting button 243 is clicked.

When the operation signal corresponding to the click of the deleting button 243, the artist link GUI control section 52, in step s105, determines the instruction for the deletion of the artist from the artist group, and the step is proceeded to the step S106.

In step s106, the artist link GUI control section 52 controls the artist link processing control section 53, and enables the editing of the artist link correspondence table 83. The artist link processing control section 53 controls the database access processing section 54, and enables the deletion of the information for the selected artist from the selected artist group in the artist link correspondence table 83. In the artist link correspondence table 83, the information in which the artist ID for the artist group AG3 is co-related to the artist ID for the artist AT4 are deleted. The updated information in the artist link correspondence table 83 is provided to the artist link GUI control section 52.

In step s107, the artist link GUI control section 52 provides the updated information in the artist link correspondence table 83 from the artist link processing control section 53 to the artist link display processing section 51.

In step s108, the artist link display processing section 51, based on the updated information in the artist link correspondence table 83, re-draws the artist link map editing screen 201.

Thus, on the display section 17, the artist group list screen 212, the artist link map editing screen 201 in the artist link tree screen 213, in which the link of the artist AT4 to the artist group AG3 is cancelled, are displayed.

In step s101, when the adding of the artist to the artist group is determined to be instructed, and furthermore, in step s105, the deletion of the artist from the artist group is determined to be instructed, the re-drawing of the artist link map editing screen 201 executed in step s104 is executed during the re-drawing of the artist link map editing screen 201 in step s108.

Figure 11:
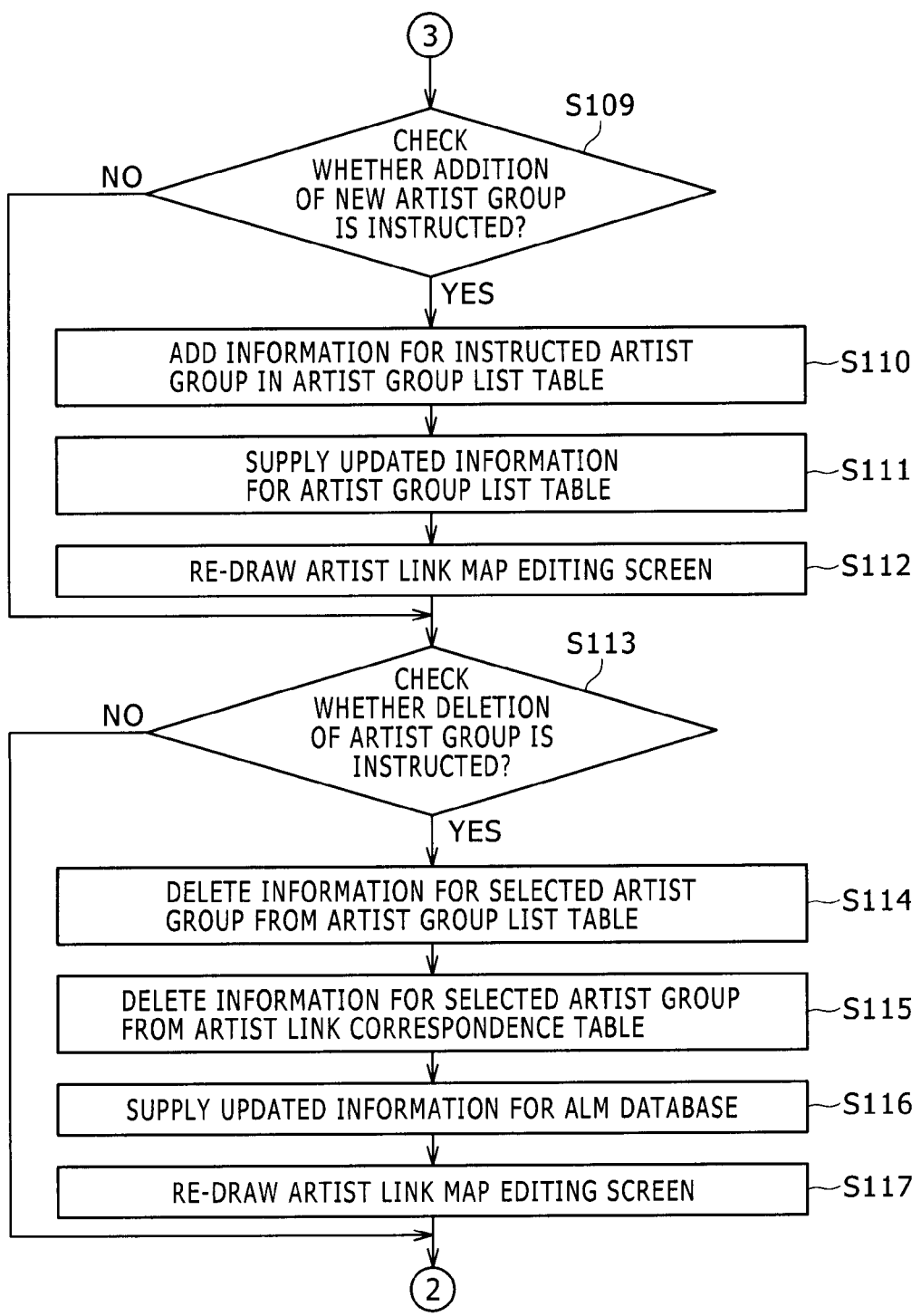
FIG. 11 is another flow chart illustrating a processing for editing artist link information.

In step s105, when the deletion of the artist from the artist group is determined to be not instructed, the step proceeds to the step S109 shown in the FIG. 11. In step s109, the artist link GUI control section 52 determines whether the addition of the new artist group is instructed or not. For example, in the artist group list screen 212 in the artist link map editing screen 201 shown in FIG. 9, when the button 242 for adding the artist group is clicked, under the control by the artist link GUI control section 52, the display of the artist group, the name of which not configured, is enabled by the artist group list display processing section 103.

Then, the user inputs the artist group name (for example, AG4) through keyboard and the like constituting the operation input section 16. During the process, the user can arbitrarily input the group name. For example, when the user generates the group for the artists who recorded music under the same music producers, the user may input "so and so project" as the artist group name, or when the user generates the group for the ballet music, the user may input "ballet" as the artist group name. The user can specify the group name when generating the new artist group, so that the parameter for the co-relation among the artists included in the artist group is identified by the user.

An operation signal corresponding to addition of the new artist group (artist group AG4) is inputted from the operation input section 16, the artist link GUI control section 52 determines that addition of a new artist group is instructed in step S108, and system operation proceeds to step S110.

In step S110, the artist link GUI control section 52 controls and makes the artist link processing control section 53 execute an operation for editing the artist group list table 82. More specifically, the artist link processing control section 53 controls the database access processing section 54 to add information for the specified artist group in the artist group list table 82. In this step, for instance, a name (AG4) for the artist group AG4 and an artist ID (e.g., AGID_4) are added in the artist group list table 82. In the case described above, no artist has been added in the artist group AG4, an operation for editing the artist link correspondence table 83 is not performed. Updated information for the artist group list table 82 is supplied to the artist link GUI control section 52.

In step Sill, the artist link GUI control section 52 supplies the updated information for the artist group list table 82 from the artist link processing control section 53 to the artist link display processing section 51.

In step S112, the artist link display processing section 51 re-draws the artist link map editing screen 201 based on the updated information for the artist group list table 82.

With the operation, the artist group list screen 212 with icons for the artist groups AG2 and AG3 shown in FIG. 9 and an icon for the artist group AG4 newly added therein is displayed in the display section 17.

In step S109, when it is determined that addition of a new artist group has not been instructed, the processing proceeds to step S113. In step S113, the artist link GUI control section 52 determines whether deletion of an artist group has been instructed or not. For instance, in the artist group list screen 212 in the artist link map editing screen 201 shown in FIG. 9, a delete button 243 is clicked by a user operating the operation input section 16 in the state in which a cursor 241 is overlaid on an icon for the artist group AG3 (namely, in the state where an icon for the artist group AG3 has been selected).

When the delete button 243 is clicked and a corresponding operation signal is inputted from the operation input section 16, the artist link GUI control section 52 determines, in step S113, that deletion of the artist group has been instructed, and processing proceeds to step S114.

In step S114, the artist link GUI control section 52 controls and makes the artist link processing control section 53 execute an operation for editing the artist group list table 82. In other words, the artist link processing control section 53 controls and makes the database access processing section 54 execute an operation for deleting the currently selected artist group from the artist group list table 82. For instance, in this step, the name (AG3) of the artist group AG3 and the artist group ID (AGID_3) are deleted from the artist group list table 82 shown in FIG. 4.

In step S115, the artist link GUI control section 52 controls and makes the artist link processing control section 53 execute an operation for editing the artist link correspondence table 83. Namely, the artist link processing control section 53 controls and makes the database access processing section 54 execute an operation for deleting information for the currently selected artist group from the artist link correspondence table 83. For instance, all of information corresponding to the artist group ID (AGID 3) for the artist group AG3 is deleted from the artist link correspondence table 83 shown in FIG. 4. Updated information for the ALM database 71 is supplied to the artist link GUI control section 52.

In step S116, the artist link GUI control section 52 supplied the updated information for the ALM database 71 from the artist link processing control section 53 to the artist link display processing section 51.

In step S117, the artist link display processing section 51 re-draws the artist link map editing screen 201 based on the updated information for the ALM database 71.

In response to the operation above, of the icons for the artist groups AG2 and AG3 shown in FIG. 9, the artist link map editing screen 201 including the artist group list screen 212 from which the icon for the artist group AG3 has been deleted and the artist link tree screen 213 is displayed in the display section 17.

When it is determined in step S109 that addition of a new artist group has been instructed and also it is determined in step S113 that deletion of an artist group has been instructed, re-draw of the artist link map editing screen 201 performed in step S112 and re-draw of the artist link map editing screen 201 in step S117 are executed simultaneously.

Figure 12:
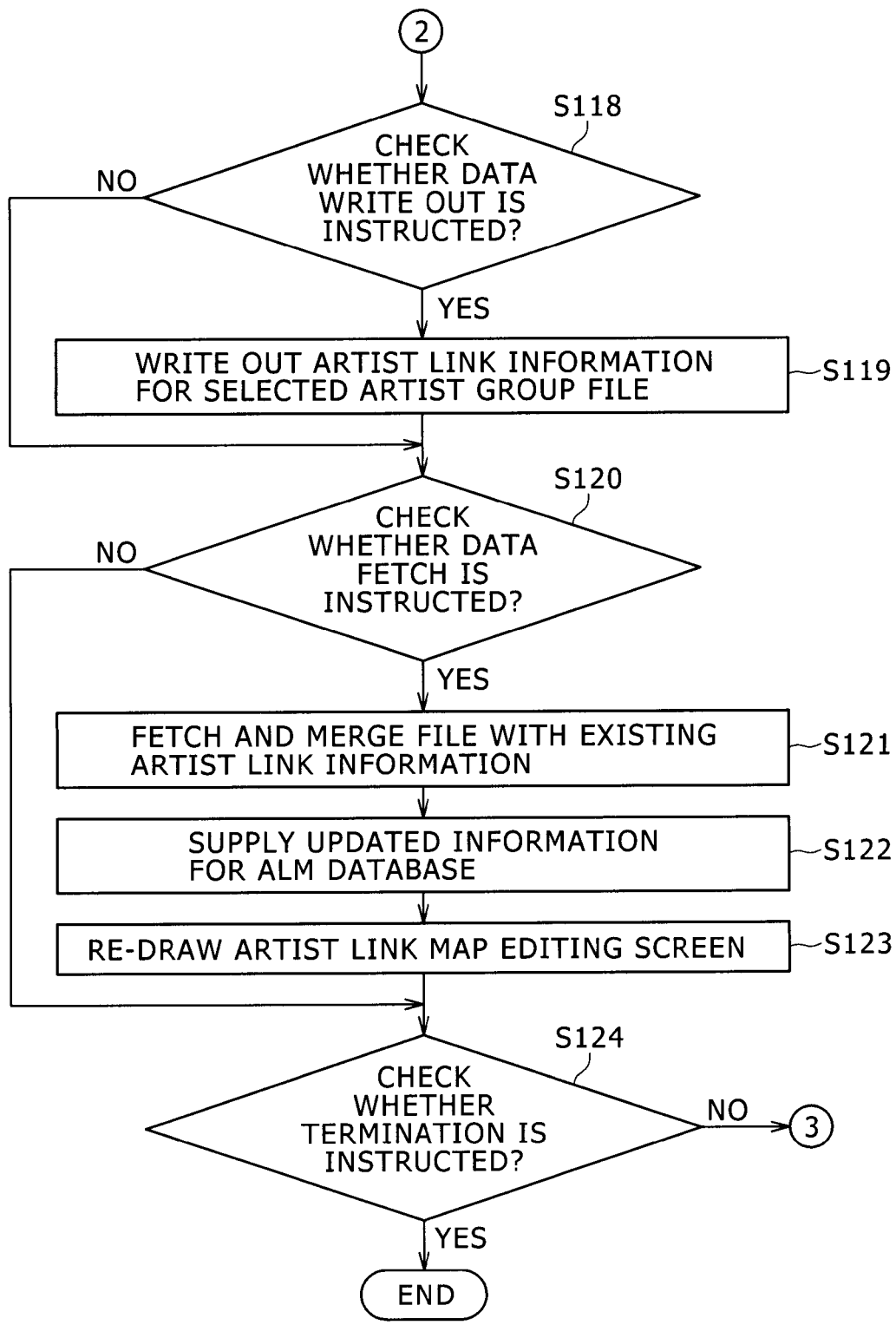
FIG. 12 is a further flow chart flow chart illustrating a processing for editing artist link information.

When it is determined in step S113 that deletion of the artist group has not been instructed, processing proceeds to step S118 shown in FIG. 12. In step S118, the artist link GUI control section 52 determines whether an operation for writing out artist link information has been instructed or not. For instance, in the artist group list screen 212 in the artist link map editing screen 201 shown in FIG. 9, in the state in which the cursor 241 is overlaid on the desired artist groups AG2 and AG3 (for instance, in the state where icons for the artist groups AG2 and AG3 are on selection), a user clicks the write out button 245 by operating the operation input section 16.

When an operation signal is inputted from the operation input section 16 in response to an operation of clicking the write out button 245, the artist link GUI control section 52 determines in step S118 that an operation has been instruction for writing out the artist link information, and processing proceeds to step S119.

In step S119, the artist link GUI control section 52 controls and makes the artist link processing control section 53 execute an operation for writing out the artist link information for the artist group currently on selection from the ALM database 71 in a file. More specifically, the artist link processing control section 53 controls and makes the database access processing section 54 write out artist link information for the artist groups AG2 and AG3 from the ALM database 71, for instance, in the XML file and store the artist link information in the storage section 19 of the PC1. It is to be noted that the file format is not limited to the XML file.

As described above, the artist link information is written out as an XML file, and therefore the written-out artist link information can be transferred to another PC1. The artist link information can be fetched at the other PC1 and can be used as described below.

In step S118, the artist link GUI control section 52 determines that no operation for fetching artist link information has been instructed, the processing proceeds to step S120.

In step S120, the artist link GUI control section 52 determines whether an operation for fetching artist link information has been instructed. For instance, in the artist group list screen 212 of the artist link map editing screen 201 shown in FIG. 9, a user clicks the fetch button 244 by operating the operation input section 16.

In response to the clicking operation, a window (a slave screen) is displayed for promoting selection of a file is displayed on the artist link display processing section 51. Then the user selects an XML file to be fetched with a mouse or the like constituting the operation input section 16.

When an operation signal corresponding to a selected XML file is inputted, the artist link GUI control section 52 determines in step S120 that an operation for fetching a file has been instructed, and processing proceeds to step S121.

In step S121, the artist link GUI control section 52 controls the artist link processing control section 53, and executes an operation for updating the ALM database 71 in the selected XML file. Namely, the artist link GUI control section 52 fetches the selected XML file, and merges the artist link information described in the XML file with the existing artist link information (in the ALM database 71). In other words, the artist link processing control section 53 controls the database access processing section 54 to add, of the artist link information described in the XML file, artist link information not included in the existing artist link information (in the ALM database 71) (for instance, artist information, artist group information, and correspondence between artists and artist groups). The updated information in the ALM database 71 is supplied to the artist link GUI control section 52.

In step S122, the artist link GUI control section 52 supplies the updated information for the ALM database 71 from the artist link processing control section 53 to the artist link display processing section 51.

In step S123, the artist link display processing section 51 re-draws the artist link map editing screen 201 in response to an operation for editing the ALM database 71 by the artist link GUI control section 52. With the operation, displayed in the display section 17 is the artist link map editing screen 201 in which an artist added based on the fetched artist link information or an icon corresponding to the added artist or artist group is added.

When it is determined in step S120 that an operation for fetching a file has not been instructed, processing proceeds to step S124. In step S124, the artist link GUI control section 52 determines whether termination of the operation for editing the artist link information has been instructed. For instance, the user clicks the artist link editing terminate button 214 provided in an upper portion of the artist link tree screen 213 in the artist link map editing screen 201 shown in FIG. 9.

In response to an operation for clicking the artist link editing terminate button 214 performed by the user with the operation input section 16, the artist link GUI control section 52 determines in step S162 that termination of an operation for editing the artist link has been instructed, and terminates display of the artist link map editing screen 201. With this operation, the operation for editing the artist link information is terminated.

Figure 10:
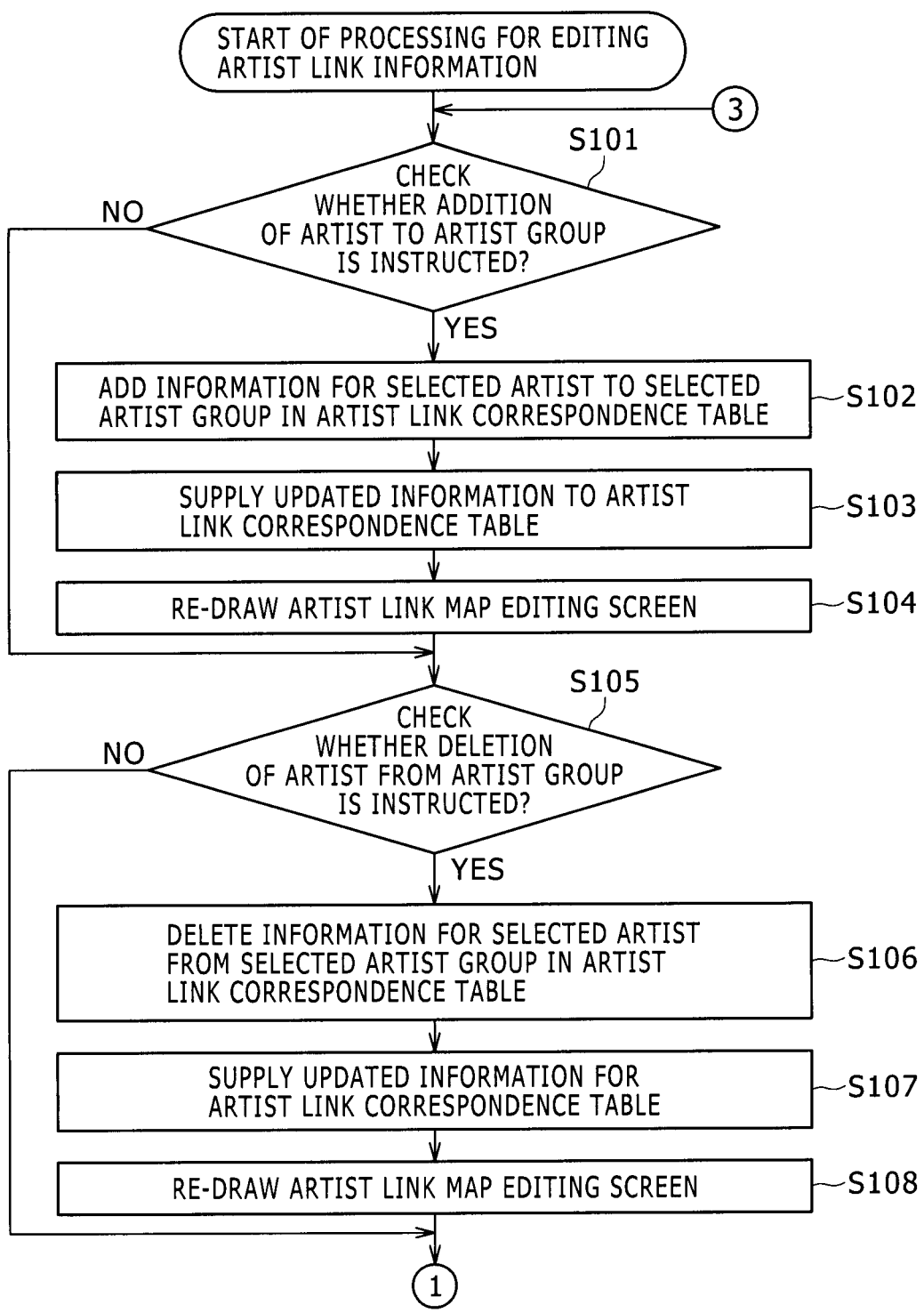
FIG. 10 is a flow chart illustrating a processing for editing artist link information.

When it is determined in step S124 that termination of the operation for editing the artist link has not been instructed, processing flows back to the step S101 shown in FIG. 10, and the processing steps after the step S101 are repeated.

Operations for adding and deleting an artist to and from an artist group, operations for adding and deleting an artist group, and operations for writing out artist link information and fetching the artist link information are described above as representatives of the operations for editing artist link information. However, other editorial operations such as addition and deletion of an artist to and from the artist group list table 81, an operation for changing an order of priority of artists in an artist group in the artist link correspondence table 83 can be performed similarly.

As described above, the artist link information generated based on detailed metadata can be edited according to user's operations, and artist link information prepared by the user's friend or those provided by a server providing artist link information can be fetched, and therefore not only information for artist with the contents registered in the contents information database 72, but also information of artists with the contents not registered in a user's my library can be displayed in the artist link map editing screen 201.

Therefore, the user can know artists with the contents not known to the user, and also those not known to the user. Furthermore, even when a user does not have contents relating to a starting artist or related artists, by operating the music site icons 261 displayed at the side of the starting artist or the related artists in the artist link tree screen 213, the user can directly access the contents server 3 to search for a desired artist as described below.

Then an operation for searching contents directly from the contents server 3 in the artist link tree screen 213 represented by the PC1 is described below with reference to the flow chart shown in FIG. 13.

In the display section 17, the artist link map editing screen 201 shown in FIG. 9 is displayed according to control by the artist link GUI control section 52. For instance, the user selects a music site icon 261-3 displayed at the right side of the correlation icon 253 with the characters of artist AT5 grayed out by operating the operation input section 16. Although not described below, the description above is also applicable to music site icons 261 for other artists (AT2 or AT3).

When an operation signal is inputted from the operation input section 16 in response to selection of the music site icon 261-3, the artist link GUI control section 52 determines that the music site icon 261-3 has been selected, namely that data search in the contents server 3 has been instructed. In step S201, the artist link GUI control section 52 controls and makes the artist link processing control section 53 to acquire an artist name corresponding to the music site icon 261-3 (artist AT5 in the current case) from the ALM database 71 and supply the artist name to the artist search control section 55.

In step S202, the artist search control section 55 generates data for a demand of search suing the acquired artist. For instance, when the artist name is "XXXXXX", the artist search control section 55 generates the search URL shown in FIG. 14 as data for a demand of data search using the artist name of "XXXXXX" to the contents server 3.

FIG. 14 shows the search URL of "http://music_site.jp/servlet/ArtistFinder?TEMPLATE-SS_ArtLinkSrch Rslt.htm&INTERVAL=30&Name_WORD=XXXXXX". which is the search URL when the artist name is "XXXXXX". In the URL above, "music-site. jP" represents, for instance, a URL of the contents server 3. This search URL is data for demanding search for the artist name of "XXXXXX" to the contents server 3.

The artist search control section 55 supplies the generated search demand data (namely, the search URL) to the network communication control section 58. In step S203, the network communication control section 58 controls and makes the network communication section 59 send the search demand data to the contents server 3. The network communication section 59 sends the search demand data via the communication section 20 and the network 2 to the contents server 3.

The communication section 20 in the contents server 3 receives the search demand data from the PC1 via the network 2, and supplies the data to the CPU 11. The CPU 11 searches names of various artists with the contents stored in the contents database 4 using the artist name described in the search demand data to the contents server 3 as a keyword for the data search, and sends a result of data search using the artist name via the network 2 to the PC1 by controlling the communication section 20.

The network communication section 59 in the PC1 receives a result of data search via the a communication section 20 and the network 20 from the contents server 3, and supplies the received result of data search to the artist search control section 55.

FIG. 15 shows a result of data search with the artist name of "Sakamoto".

<?xml version="1.0" encoding="Shift-jis"?> in the first line indicates that the search result is described with XML version 1.0 and encoded by Shift-jis. <search_result> in the second line and </search_result> in the 36-th line indicates that the search result extends from the third line up to the 35-th line.

<org_name_word>Sakamoto </org_name_word> in the third line indicates that the search key is "Sakamoto". <all_count>5</all_count> in the fourth line indicates that five artists stored in the contents database 4 are hit. <begin_index>1</begin_index> in the fifth line and <end_index>5</end_index> in the sixth line indicate that the first one is a first artist and the last one is a fifth artist. <artist_count>5</artist_count> in the seventh line indicates that the artist is five. <page_count>1</page_count> in the eighth line indicates that description of the search result extends only on one page.

<item> in the ninth line and </item> in the 35-th line indicate that a section from the 10-th line to the 34-th line is a search result for each hit item (artist). <artist> in the tenth line and </artist> in the 14-th line indicate that a search result for one of the five artists is described from the 11-th line to the 13-th line. <url>http://music_site.jp/artist/80307744/70000417/</url> in 11-th line represents an address of a page for the artist in the 12-th line in the contents server 3. <art name>Sakamoto Hanako</art_name> in the 12-th line indicates that a name of the artist hit as a result of data search using "Sakamoto" is "Sakamoto Hanako". <entry>12<entry> in the 13-th line indicates that the number of contents for "Sakamoto Hanako" is 12.

<artist> in the 15-th line and </artist> in the 19-th line indicate that a search result for one of the five artists is described in a section from the 16-th line to the 18-th line. <url>http://music_site.jp/artist/80311316/VIA008957/</url> in the 16-th line represents an address (URL) of a page for the artist in the 17-th line in the contents server 3. <art_name>Sakamoto Taro,/art_name> indicates that a name of the artist hit as a result of data search using "Sakamoto" is "Sakamoto Taro". <entry>8</entry> in the 18-th line indicates that the number of contents corresponding to "Sakamoto Taro" is 8 in the contents server 3.

<artist> in the 20-th line and </artist> in the 24-th line indicate that a search result for one of the five artists is described in a section from the 21-th line to the 23-th line. <url>http://music_site.jp/artist/80312087/WMG4365/</url> represents an address (URL) of a page for the artist in the 22-th line in the contents server 3. <art_name> Mr. Sakamoto </art_name> in the 22-th line indicates that a name of the artist hit as a result of search using "Sakamoto" is "Mr. Sakamoto". <entry>27</entry> in the 23-th line indicates that the number of contents corresponding to "Mr. Sakamoto" is 27 in the contents server 3.

<artist> in the 25-th line and </artist> in the 29-th line indicate that a search result for one of the five artists is described in a section for the 26-th line to the 28-th line. <url>http://music_site.jp/artist/80311556/UMLG00559/</url> represents an address (URL) of a page for the artist in the 27-th line in the contents server 3. <art_name> Sakamoto Hanako </art_name> in the 27-th line indicates that a name of the artist high as a result of search using "Sakamoto" is "Sakamoto Sakako". <entry>241</entry> in the 28-th line indicates that the number of contents corresponding to "Sakamoto Sakako" is 241.

<artist> in the 30-th line and </artist> in the 34-th line indicate that a search result for one of the five artists is described in a section from 31-th to the 33-th line. <url>http://music_site.jp/artist/80312032/EMI00271/</url> represents an address (URL) of a page for the artist in the 32-th line in the contents server 3. <art-name> Suzuki Gen and Skamoto Hanako </art name> indicates that names of the artists hit as a result of search using "Sakamoto" is "Suzuki Gen and Sakamoto Sakako". <entry>12</entry> in the 33-th line indicates that the number of contents corresponding to "Suzuki Gen and Sakamoto Sakako" is 12.

The XML data described above is sent as a search result from the contents server 3.

Again referring to FIG. 13, in step S204, the artist search control section 55 generate a displaying URL (hereinafter, refers to as a display address URL as a display demand data specifying the address in accordance with the search result. Namely, the artist search control section 55 determines the number of hit items based on a figure described in the <all_count>5</all_count) in the fourth line of the search result shown in FIG. 15, and decides the display address URL in response to a case where the number of hit items is one, a case where the number of hit items is two or more, or a case where the number of hit items is zero as shown in FIG. 16.

When the number of hit items is one, namely, for instance, when only "Sakamoto Hanako" is hit as a result of search result shown in FIG. 15, <url>http://music_site.jp/artist/80307744/70000417/</url> which is a URL in the 11-th line of the tag <artist> in the 10-th line shown in FIG. 15 (namely a URL of a page for the artist name "Sakamoto Hanako") is used as a URL address for display.

When the number of hit items are two or more, a URL searched using an artist name as a search key (when the artist name is "XXXXXX", "http://music_site.jp/servlet/ArtistFiner?TEMPLATE=ss_ArtLinkSrch_Rslt.html&INTERVAL=30&Name_WORD=XXXXXX) is used as the display address URL. In the case shown in FIG. 15, the number of hit items is five, and therefore the description is applicable to this case.

When the number of hit items is zero (namely, when nothing is hit), like in the case where the number of hit items is two or more, the URL searched using an artist name as a search key (when the artist name is "XXXXXX", "http://music_site.jp/servlet/ArtistFiner?TEMPLATE=ss_ArtLinkSrch_Rslt.html&INTERVAL=30&Name_WORD=XXXXXX) is used as the display address URL.

Again by referring to FIG. 13, as the artist search control section 55 supplies the decided the display address URL to the network communication control section 58, in step S205, the network communication control section 58 controls the communication control section 58 so that the display address URL is sent to the contents server 3. The network communication section 59 sends the display address URL via the communication section 20 and the network 2 to the contents server 3.

The communication section 20 in the contents server 3 receives the display address URL via the network 2 from the PC1, and supplies the display address URL to the CPU 11. The CPU 11 sends, in step S222, data for configuring a screen corresponding to the display address URL (such as image data or html data) via the network 2 to the PC1 by controlling the communication section 20.

The network communication section 59 in the PC1 receives the data from the contents server 3 via the communication section 20 and the network 2, and supplied the received data to the basic GUI control section 57. In step S206, the basic GUI control section 57 controls the basic display processing section 56 so that a search result screen 301 corresponding to the data from the contents server 3 is displayed in the display section 17 together with the basic function display screen 202.

Figure 18:
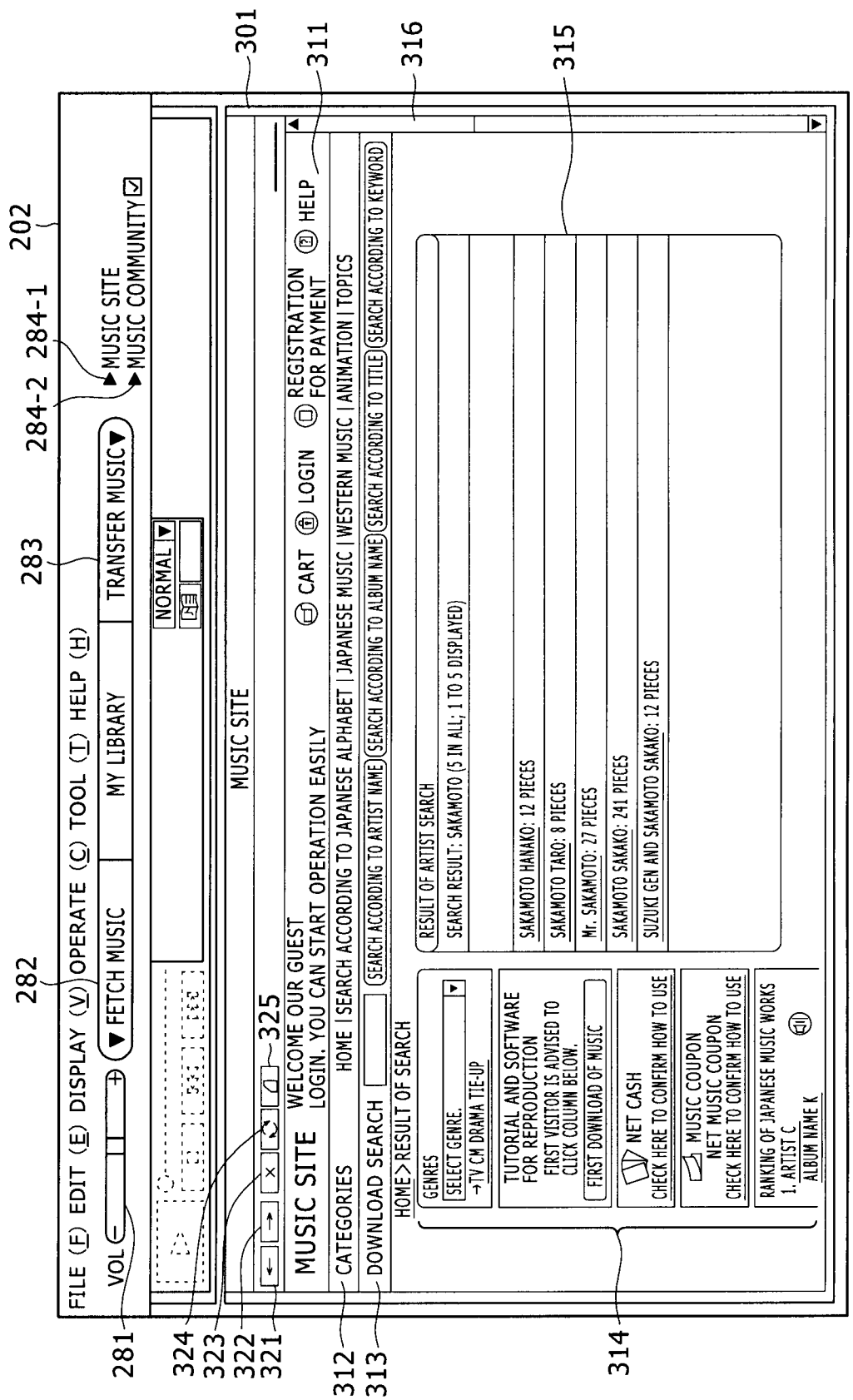
FIG. 18 is a view illustrating another example of a configuration of the search result screen.

Because of the operation, for instance, when the number of hit items is one, the search result screen 301 is displayed in the display section 17. When the number of hit items is two or more, the search result screen 301 shown in FIG. 18 is displayed in the display section 17. When the number of hit items is zero, the search result screen 301 shown in FIG. 19 is displayed in the display section 17.

Figure 17:
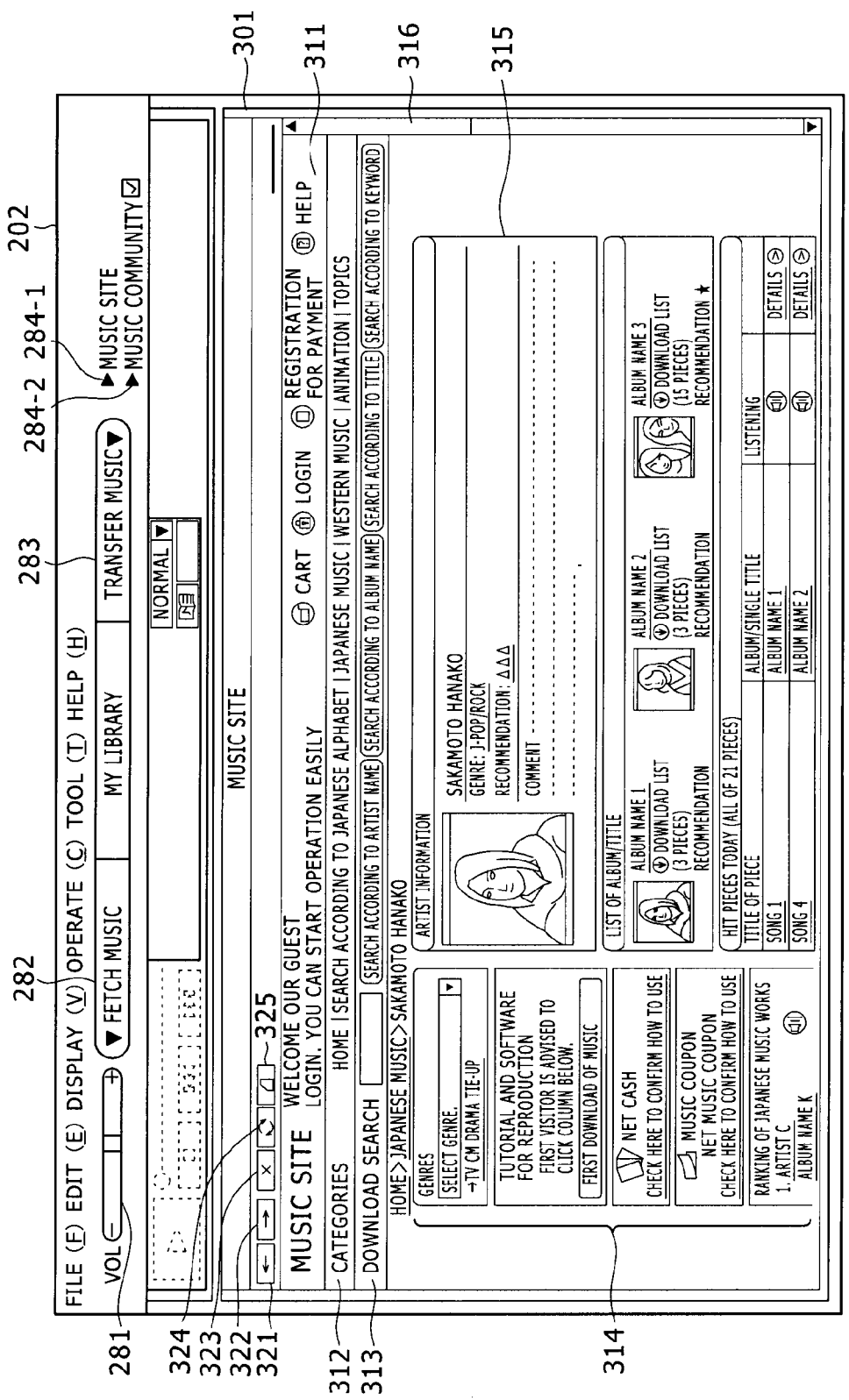
FIG. 17 is a view illustrating an example of a configuration of a search result screen.

FIG. 17 illustrates an example of a display screen displayed in the display section 17. It is to be noted that the same symbols are assigned to sections corresponding to those in the display screen shown in FIG. 9.

In the area capable of being switched to another screen in the display screen shown in FIG. 17, the search result screen 301 provided from the contents server 3 when the number of hit items is one (for instance, when only the artist name of "Sakamoto Hanako" is hit in FIG. 15) is displayed.

A title showing that the current screen is a screen from the contents server 3 is shown at an uppermost portion of the search result screen 301. Provided under the title at a diagonally left portion are a return button 321 used to returning to a preceding page, an advance button 322 for advancing to a next page, a stop button used for stopping display, an update button 324 for updating display, and a home position button used for returning to display to a prespecified home position.

Furthermore provided under the buttons described above is a tool bar 311 showing usage tools of music site. Shown on the tool bar 311 is "Cart tool" used for temporally keeping contents to be purchased or the line on board, "Login tool" used for logging in a music site, "Simple clearance registration tool" used for registration for simple clearance for purchased contents, and "Help tool". The user can select any of the tools to move to a page for use of the page.

Provided under the tool bar 311 is a category bar 312 configured with tags displaying contents by each category. Displayed on the category bar 312 are tags, namely "Home" for returning to the starting page, "Search according to Japanese alphabet" used for displaying contents according to a selected Japanese alphabet, "Japanese music" used for displaying only contents of Japanese music, "Western music" used for displaying only western music, "Animation for displaying only contents relating to songs for animation program, and "Topics" used for displaying only contents picked up in a specific program. By selecting any of the tags, a user can have contents belong to a desired category displayed on the screen.

A search bar 313 is provided under the category bar 312. Shown on the search bar 313 are a "artist name search buttom" used for searching by using a character input space, or a word input in the character input space as an artist name, an "album name search button" used for searching an album by using a word input into the character input space as an album name, a "song title search button" used for searching by using a word input into the character input space as a song title, and a "keyword search button" used for searching a word input into the character input space as a keyword. A user can search for data belonging to a desired category by inputting a work in the character input space and selecting a desired search button.

Provided under the search bar 313 are a menu display section 314 in which such information as search by category, a tutorial, a method of using net cash or a music coupon, ranking of music pieces in the contents server 3 are displayed, and a search result displaying section 315 in which a search result for the artist name instructed from the artist link map editing screen 201. In the right side from the search result screen 301, a scroll bar 316 for displaying the search result screen 301 in the scrollable state is displayed.

FIG. 17 shows a case in which the search result display section 315 provided when the number of items is one is displayed, and the page for the artist name of "Sakamoto Hanako" shown in <url>http://music_site.jp//artist/80307744/70000417/</url> is displayed in the search result display section 315.

In the search result display section 315, artist information for "Sakamoto Hanako" including images of representative albums, genre information, other recommended information, and detailed information, a list of albums and single pieces, and a current ranking for contents corresponding to "Sakamoto Hanako" are shown in the descending order. The underlined characters indicate that there is provided a link for moving a page in which detailed information corresponding to a selected character is displayed in detail.

AS described above, since a page corresponding to music site icons 261 selected by a user is displayed, the user can check contents for a desired artist or purchase the contents easily.

FIG. 18 illustrates another example of a display screen displayed in the display section 17. In the area capable of being switched to another display screen in the display screen shown in FIG. 18, the search result screen 301 for the case shown in FIG. 15 when the number of hit items is five.

In the example shown in FIG. 18, a result of search for artists searched with the artist name of "Sakamoto" (one to five items among the five items) is displayed in the search result display section 315. More specifically, displayed in the search result display section 315 are artists and contents for the artists, namely "Sakamoto Hanako 12 titles", "Sakamoto Taro 8 titles", "Mr. Sakamoto 27 titles", "Sakamoto Sakako 241 titles", and "Suzuki Gen and Sakamoto Sakako 12 titles".

Each artist name is underlined, and a network link is provided so that a user can get a page for each artist as shown, for instance, in FIG. 17 by selecting the artist name.

With the configuration, when a user selects a name of a desired artist from among the plurality of searched artists, as described above with reference to FIG. 17, a page for the desired artist is displayed, a user can easily check contents of a desired artist or purchase the contents.

FIG. 19 shows another example of the display screen displayed in the display section 17. In the area capable of being switched to another display screen in the display screen shown in FIG. 19, the search result screen 301 for a case where the number of hit items is zero, namely where no item is hit is displayed.

In the example shown in FIG. 19, a "AAA not found" is displayed as a result of search for artist names according to the artist name of AAA".

Therefore, the user can easily know that a desired artist is not registered in the contents server 3. In this case, the user can operate, for instance, the return button to restore the artist link map editing screen 201 and reproduce contents for another desired artist.

As described above, in the artist link map editing screen 201, music site icons corresponding to each artists are provided near icons for the starting artist or for the related artists. Because of the configuration, the user can demand search for a corresponding artist name to the contents server 3 only by selecting (clicking on) a desired music site icon.

As described above, a user can easily know an artist as a starting point for data search and other correlated artists only by selecting a music site icon. The user can also purchase of contents for the starting artist or other correlated artists.

The starting artist or the correlated artists, icons of which are displayed in the artist link map editing screen 201 may be artists with the contents not stored in the contents file storing section 73, because the artist link information can also be acquired, for instance, from a user's friend. In other words, a user can search for information concerning an artist whom the user know first by checking the artist link information shown in the artist link map editing screen 201 from the contents server 3 any time, and furthermore the user can purchase the contents according to the necessity.

Because of the functional configuration as described above, purchase of contents not owned by users can be promoted, which contributes to sales promotion of contents.

The description above assumes a case in which an icon for a music site is provided at the side of ions for a starting artist or for correlated artists, but also a configuration is allowable in which a music site ion is provided at the side of folder icons for the artist groups. In this case, data search using an artist group name can be demanded to the contents server 3.

The description above assumes a case in which artist link information for artists relating to contents is displayed on the screen, but the displayed item is not limited to the artist link information for artists correlated to contents, and a reason for correlation may be displayed visually with a tree format. This scheme can also be applied to contents. For instance, when a starting contents, a category group with the starting contents included therein, and other correlated contents included in the category group or the like are displayed, a music site ion is displayed in correspondence to each contents. In this configuration, data search can be performed according to the corresponding contents name in the contents server 3, only by selecting the music site icons 261 and therefore a user can acquire a desired contents from the contents server 3.

The configuration described above displays, between a starting artist and artists correlated to the starting artist, an artist group indicating the correlation in the artist list map preview screen 211 in which artist link information for the starting artist described above is displayed with a tree format, but the present invention is not limited to the configuration, and the artist group is not always demanded to be displayed between a starting artist and artists correlated to the starting artists. For instance, the configuration is allowable in which correlated artists are displayed at the side of a starting artist in the arrayed state, and furthermore an artist group is displayed in the right side from the correlated artists.

The description is made above by referring to a case where moving pictures or music contents are provided, but the present invention is not limited to display of moving pictures or music contents, and is also applicable to the contents such as applications.

Furthermore, although the description above assumes a case where the information processing device is a personal computer such as the PC1 shown in FIG. 2, but the present invention is not limited to the use of the PC1, and is applicable to a PD7 which s a portable recording/reproducing device, a mobile phone, other types of PDA (Personal Digital Assistance) equipment, a reproducing device such as an AV (Audio Visual) equipment, electronic home appliances such as CE (Consumer Electric) equipment.

The description above assumes a case in which a search demand using an artist name is sent to the contents server 3 providing music contents, but the search demand is not limited for demanding to be sent to the contents server 3, and may be sent to other servers allowing data search using an artist name as a search key.

The series of operations described above may be executed by hardware, but also be executed by software.

When the serried of operations are executed by software, various functions can be executed with a computer in which a program constituting the software is incorporated in a dedicated hardware or by installing various types of programs in a computer. The programs are installed, for instance, in a general-purpose personal computer from a network or a recording medium.

The recording medium includes not only package media separated from a main body of a computer and distributed to users for providing programs, but also a ROM 12 or a hard disk incorporated in the storage section 16, each of which is provided to a user after the recording medium is previously incorporated in the device, and in which demanded programs are stored. The recording medium includes such as a magnetic disk (including a flexible disk), an optical disk (CD-ROM (Compact Disc-Read Only Memory), a DVD (Digital Versatile Disc), a magneto optical disk (MD (Mini-Disc) (trademark)), or a removable medium 22 made of a semiconductor memory, in each of which a program is recorded.

The steps described in the specification and illustrated in the flow charts are not limited for demanding to be executed according to the described or illustrated time-series, and furthermore may be executed concurrently or discretely.

The term of system as used herein indicates a system including a plurality of devices as a whole.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
   a processor;
   a contents storage unit that stores a plurality of audio or video content;
   a storage unit that stores a table with artist identifiers for each of the plurality of audio or video contents and plural categories representing a grouping of artist identifiers, wherein the artist identifiers and the plural categories are correlated to each other in the table, and the categories including user generated categories and categories generated by the processor from metadata of the audio or video contents, the metadata including at least one of a name of an album in which said audio or video contents is included, a name of an artist playing or providing content, a genre of the content, a music tone, rhythm, or ranking value;
   a first display control unit that provides a graphical user interface that displays a correlation between a selected artist identifier, which identifies an audio or video content that is stored in the contents storage unit, and another related artist identifier within a same category, of the plural categories, as the selected artist identifier, said related artist identifier identifies an audio or video content that is not stored in the contents storage unit,
   wherein the processor automatically generates and transmits a request for a data search to a remote computer communicatively coupled through a communications network to the information processing device for information regarding the related artist identifier in response to a selection of the related artist identifier on the graphical user interface; and
   a communication interface that receives, from the remote computer, a URL that when accessed with the processor, provides another graphical user interface that displays search results of the data search and a link to purchase the audio or video content corresponding to the related artist identifier.

2. The information processing device according to claim 1, further comprising:
   a second display control unit that displays a search result screen according to a result of the request for the data search received from the computer.

3. The information processing device of claim 1, wherein the graphical user interface enables a user to add an artist identifier to the category data and the processor updates the table to indicate a correlation between the added artist identifier and the categories.

4. The information processing device of claim 1, wherein the graphical user interface enables a user to delete an artist identifier from the categories and the processor updates the table to remove a correlation between the deleted artist identifier and the categories.

5. The information processing device of claim 1, wherein the graphical user interface enables a user to create a new category of data representing a user generated grouping of artist identifiers, and the processor updates the table to include a correlation between the new category of data and the user generated grouping of artist identifiers.

6. The information processing device of claim 1, wherein the graphical user interface enables a user to delete category representing the grouping of artists, and the processor updates the table to remove the deleted category.

7. A method comprising:

storing, at a contents storage unit, a plurality of audio or video content;

storing, at a storage unit, a table with artist identifiers for each of the plurality of audio or video contents and plural categories representing a grouping of artist identifiers, wherein the artist identifiers and the plural categories are correlated to each other in the table, and the categories including user generated categories and categories generated by the processor from metadata of the audio or video contents, the metadata including at least one of a name of an album in which said audio or video contents is included, a name of an artist playing or providing content, a genre of the content, a music tone, rhythm, or ranking value;

providing, by a first display control unit, a graphical user interface that displays a correlation between a selected artist identifier, which identifies an audio or video content that is stored in the contents storage unit, and another related artist identifier within a same category as the selected artist identifier, said related artist identifier identifies an audio or video content that is not stored in the contents storage unit;

automatically generating and transmitting, by a processor, a request for a data search to a remote computer communicatively coupled through a communication network to the information processing device for information regarding the related artist identifier in response to a selection of the related artist identifier on the graphical user interface; and receiving, with a communication interface, from the remote computer, a URL that when accessed with the processor, provides another graphical user interface that displays search results of the data search and a link to purchase the audio or video content corresponding to the related artist identifier.

8. A non-transitory computer readable storage medium encoded with instructions, which when executed by a processing device causes the processing device to implement a method comprising:

storing, at a contents storage unit, a plurality of audio or video content;

storing, at a storage unit, a table with artist identifiers for each of the plurality of audio or video contents and plural categories representing a grouping of artist identifiers, wherein the artist identifiers and the plural categories are correlated to each other in the table, and the categories including user generated categories and categories generated by the processor from metadata of the audio or video contents, the metadata including at least one of a name of an album in which said audio or video contents is included, a name of an artist playing or providing content, a genre of the content, a music tone, rhythm, or ranking value;

providing, by a first display control unit, a graphical user interface that displays a correlation between a selected artist identifier, which identifies an audio or video content that is stored in the contents storage unit, and another related artist identifier within a same category as the selected artist identifier, said related artist identifier identifies an audio or video content that is not stored in the contents storage unit;

automatically generating and transmitting, by a processor, a request for a data search to a remote computer communicatively coupled through a communication network to the information processing device for information regarding the related artist identifier in response to a selection of the related artist identifier on the graphical user interface; and receiving, with a communication interface, from the remote computer, a URL that when accessed with the processor, provides another graphical user interface that displays search results of the data search and a link to purchase the audio or video content corresponding to the related artist identifier.

9. The information processing device of claim 8, wherein the metadata is received over a network connection from the remote computer.

10. The information processing device of claim 9, wherein the remote computer includes two servers.

11. The information processing device of claim 9, wherein the processor generates a request for the metadata, which is transmitted to the remote computer, and the metadata is received from the remote computer in response to the request for the metadata.

* * * * *